US012647315B2

(12) United States Patent
Stein et al.

(10) Patent No.: US 12,647,315 B2
(45) Date of Patent: Jun. 2, 2026

(54) TRANSMITTING ALARM DATA IN COMMUNICATION SYSTEMS

(71) Applicant: Honeywell International Inc., Charlotte, NC (US)

(72) Inventors: Rod Stein, Edmonton (CA); Mohammad Areef Penukonda, Edmonton (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 97 days.

(21) Appl. No.: 18/672,045

(22) Filed: May 23, 2024

(65) Prior Publication Data

US 2025/0150334 A1 May 8, 2025

Related U.S. Application Data

(60) Provisional application No. 63/547,154, filed on Nov. 3, 2023.

(51) Int. Cl.
*H04L 41/0686* (2022.01)
*H04L 41/0631* (2022.01)

(52) U.S. Cl.
CPC ...... *H04L 41/0686* (2013.01); *H04L 41/0631* (2013.01)

(58) Field of Classification Search
CPC ............. H04L 41/0686; H04L 41/0631; H04L 43/062; H04L 67/12; H04L 67/55
See application file for complete search history.

(56) References Cited

U.S. PATENT DOCUMENTS

| | | | | |
|---|---|---|---|---|
| 2018/0309831 A1* | 10/2018 | Sherman | ................. | H04L 12/66 |
| 2021/0182307 A1* | 6/2021 | Ober | ........................ | H04L 67/12 |
| 2023/0214520 A1* | 7/2023 | Thomas | .............. | G06F 21/6236 |
| | | | | 726/26 |
| 2025/0184399 A1* | 6/2025 | Zhang | ..................... | H04L 12/66 |

FOREIGN PATENT DOCUMENTS

| | | | | | |
|---|---|---|---|---|---|
| EP | | 4246939 A1 | * | 9/2023 | ............. H04L 67/12 |
| WO | WO-2018190983 A1 | * | 10/2018 | ........... H04L 63/101 |

* cited by examiner

*Primary Examiner* — Philip C Lee
(74) *Attorney, Agent, or Firm* — Alston & Bird LLP

(57) ABSTRACT

Examples of techniques to enable transmission of alarm data in an industrial automation setting using a publish-subscribe communication system within an Open Platform Communications Unified Architecture (OPC UA) framework. In an example, the alarm data, initially encoded in OPC UA format, is collected from an OPC UA server over a client-server communication system. This data is then re-encoded into a target format compatible with a publish-subscribe communication network. The re-encoding process involves decoding a value from the alarm data based on OPC UA specifications and assigning the decoded value to a preidentified field in the target format. The re-encoded alarm data is then assigned to a message payload of a Message Queuing Telemetry Transport (MQTT) packet, which is subsequently published to an MQTT broker.

8 Claims, 9 Drawing Sheets

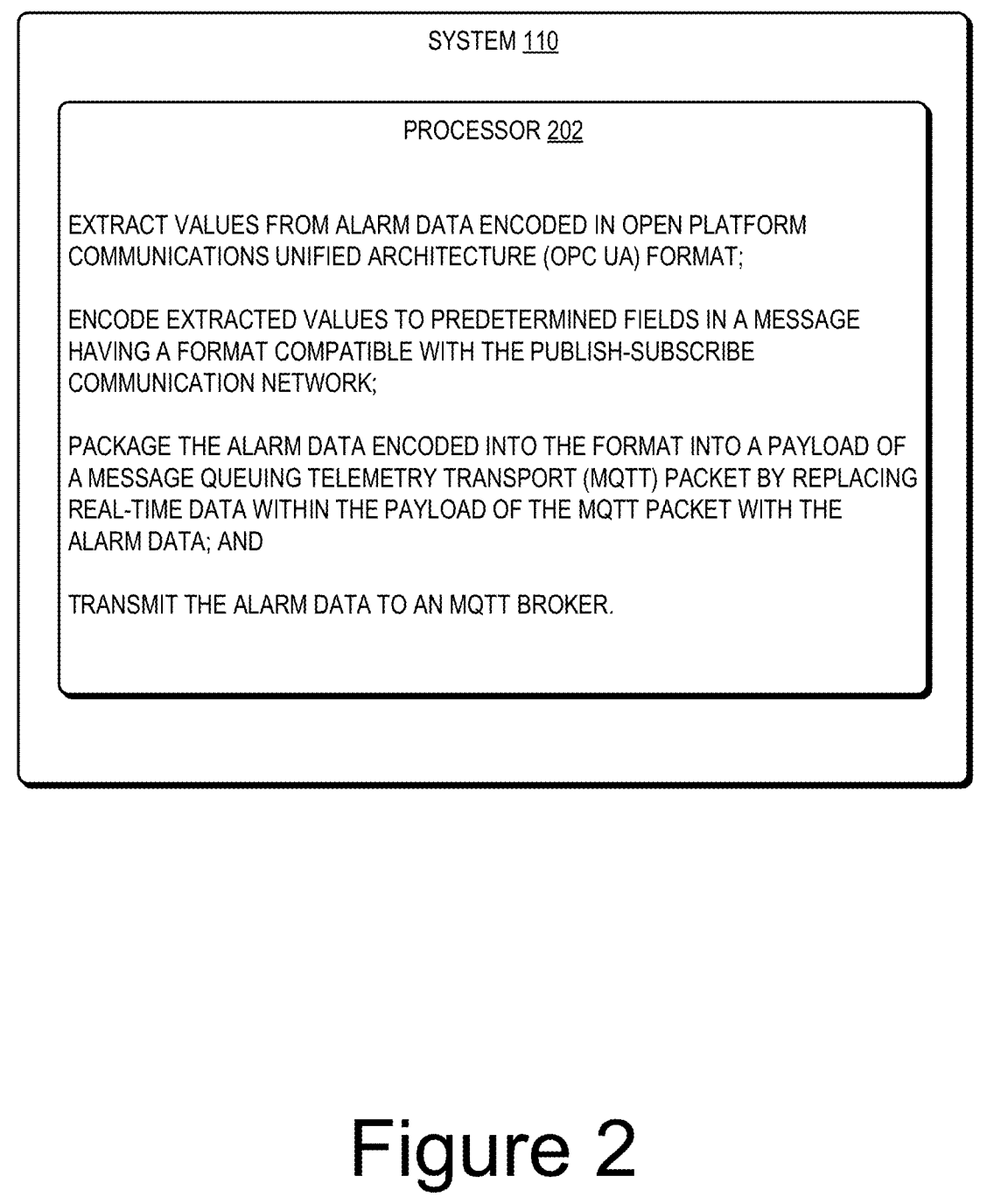

SYSTEM 110

PROCESSOR 202

EXTRACT VALUES FROM ALARM DATA ENCODED IN OPEN PLATFORM
COMMUNICATIONS UNIFIED ARCHITECTURE (OPC UA) FORMAT;

ENCODE EXTRACTED VALUES TO PREDETERMINED FIELDS IN A MESSAGE
HAVING A FORMAT COMPATIBLE WITH THE PUBLISH-SUBSCRIBE
COMMUNICATION NETWORK;

PACKAGE THE ALARM DATA ENCODED INTO THE FORMAT INTO A PAYLOAD OF
A MESSAGE QUEUING TELEMETRY TRANSPORT (MQTT) PACKET BY REPLACING
REAL-TIME DATA WITHIN THE PAYLOAD OF THE MQTT PACKET WITH THE
ALARM DATA; AND

TRANSMIT THE ALARM DATA TO AN MQTT BROKER.

Figure 2

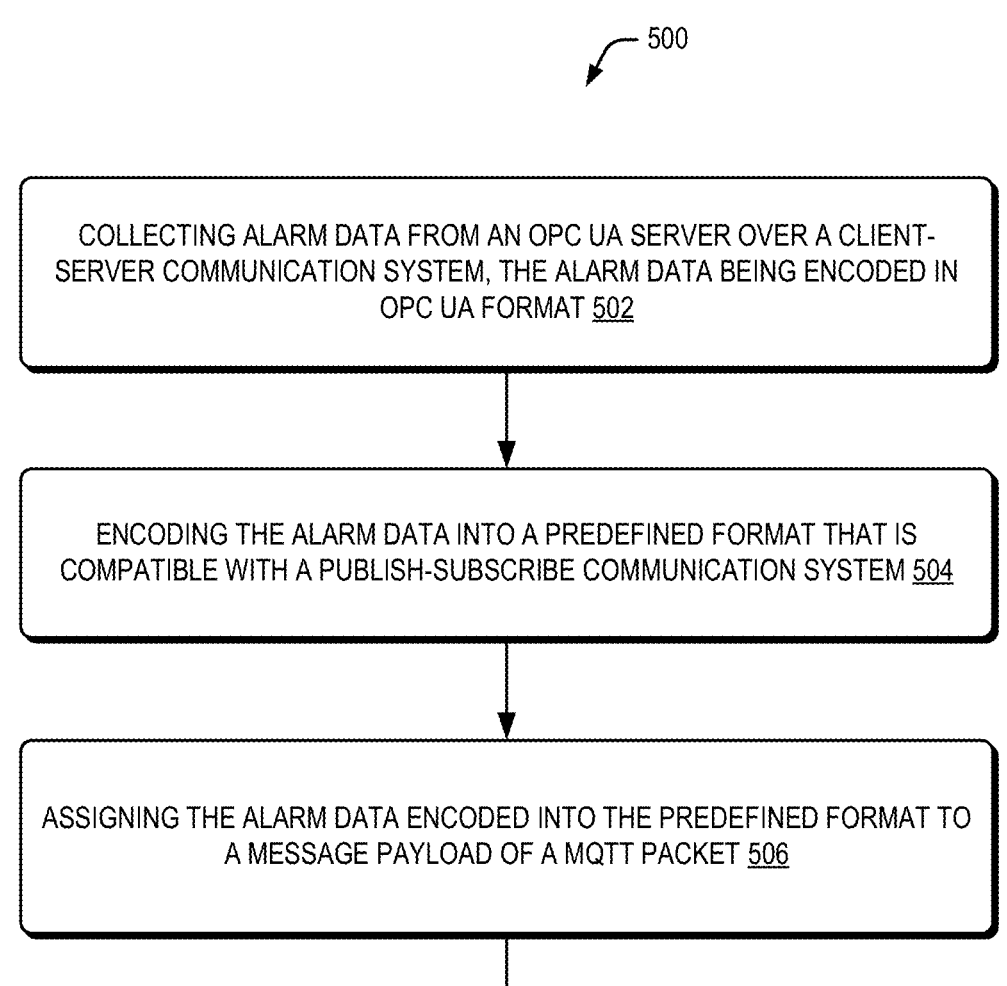

COLLECTING ALARM DATA FROM AN OPC UA SERVER OVER A CLIENT-SERVER COMMUNICATION SYSTEM, THE ALARM DATA BEING ENCODED IN OPC UA FORMAT <u>502</u>

ENCODING THE ALARM DATA INTO A PREDEFINED FORMAT THAT IS COMPATIBLE WITH A PUBLISH-SUBSCRIBE COMMUNICATION SYSTEM <u>504</u>

ASSIGNING THE ALARM DATA ENCODED INTO THE PREDEFINED FORMAT TO A MESSAGE PAYLOAD OF A MQTT PACKET <u>506</u>

PUBLISHING THE MESSAGE PAYLOAD OF THE MQTT PACKET TO AN MQTT BROKER <u>508</u>

Figure 5

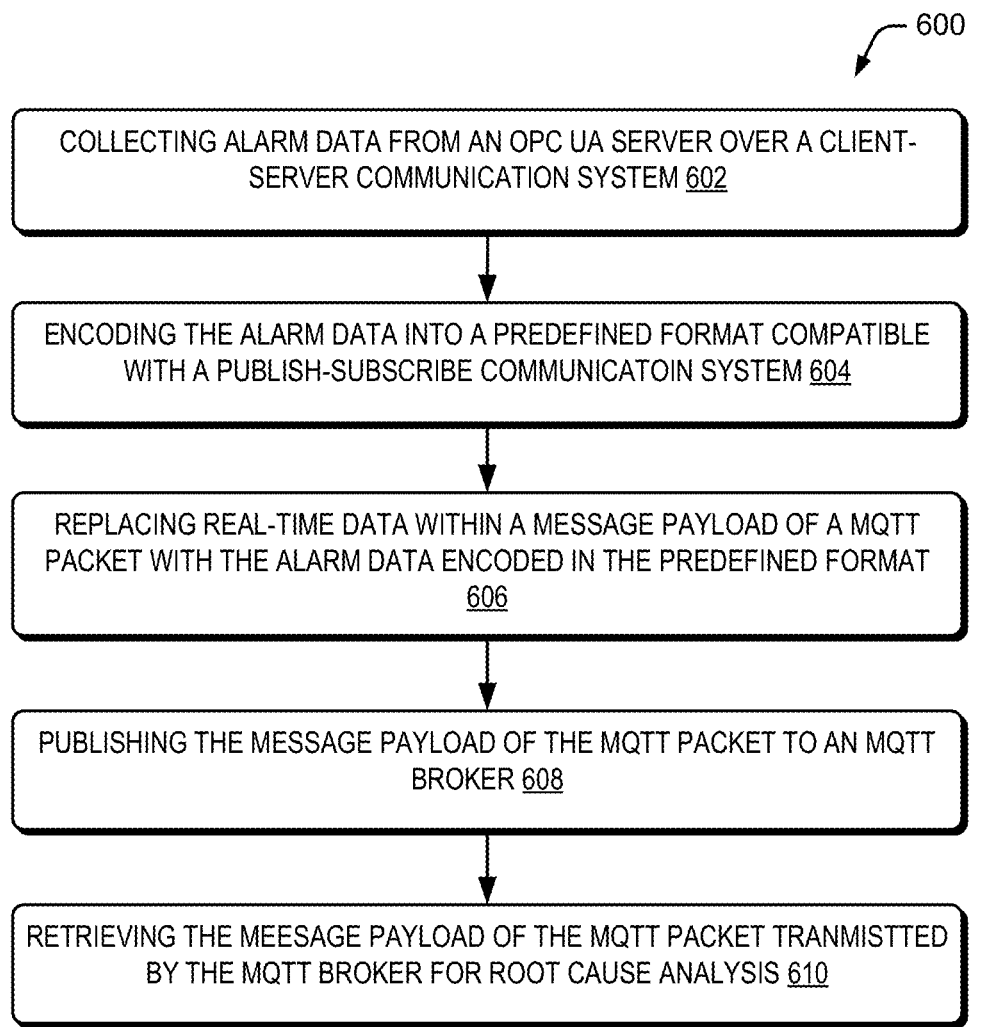

600

COLLECTING ALARM DATA FROM AN OPC UA SERVER OVER A CLIENT-SERVER COMMUNICATION SYSTEM 602

ENCODING THE ALARM DATA INTO A PREDEFINED FORMAT COMPATIBLE WITH A PUBLISH-SUBSCRIBE COMMUNICATOIN SYSTEM 604

REPLACING REAL-TIME DATA WITHIN A MESSAGE PAYLOAD OF A MQTT PACKET WITH THE ALARM DATA ENCODED IN THE PREDEFINED FORMAT 606

PUBLISHING THE MESSAGE PAYLOAD OF THE MQTT PACKET TO AN MQTT BROKER 608

RETRIEVING THE MEESAGE PAYLOAD OF THE MQTT PACKET TRANMISTTED BY THE MQTT BROKER FOR ROOT CAUSE ANALYSIS 610

Figure 6

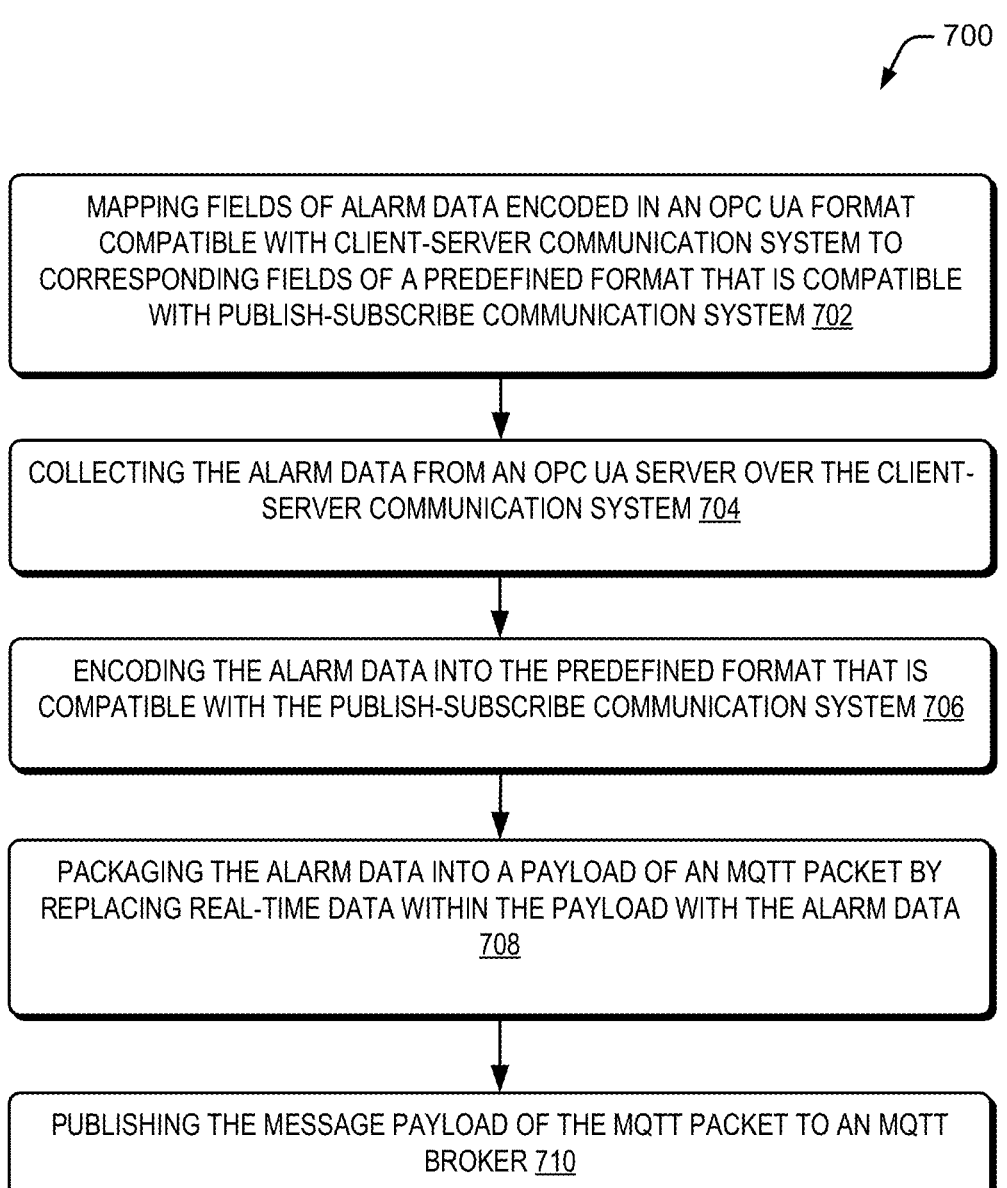

700

MAPPING FIELDS OF ALARM DATA ENCODED IN AN OPC UA FORMAT COMPATIBLE WITH CLIENT-SERVER COMMUNICATION SYSTEM TO CORRESPONDING FIELDS OF A PREDEFINED FORMAT THAT IS COMPATIBLE WITH PUBLISH-SUBSCRIBE COMMUNICATION SYSTEM 702

COLLECTING THE ALARM DATA FROM AN OPC UA SERVER OVER THE CLIENT-SERVER COMMUNICATION SYSTEM 704

ENCODING THE ALARM DATA INTO THE PREDEFINED FORMAT THAT IS COMPATIBLE WITH THE PUBLISH-SUBSCRIBE COMMUNICATION SYSTEM 706

PACKAGING THE ALARM DATA INTO A PAYLOAD OF AN MQTT PACKET BY REPLACING REAL-TIME DATA WITHIN THE PAYLOAD WITH THE ALARM DATA 708

PUBLISHING THE MESSAGE PAYLOAD OF THE MQTT PACKET TO AN MQTT BROKER 710

Figure 7

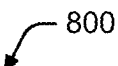

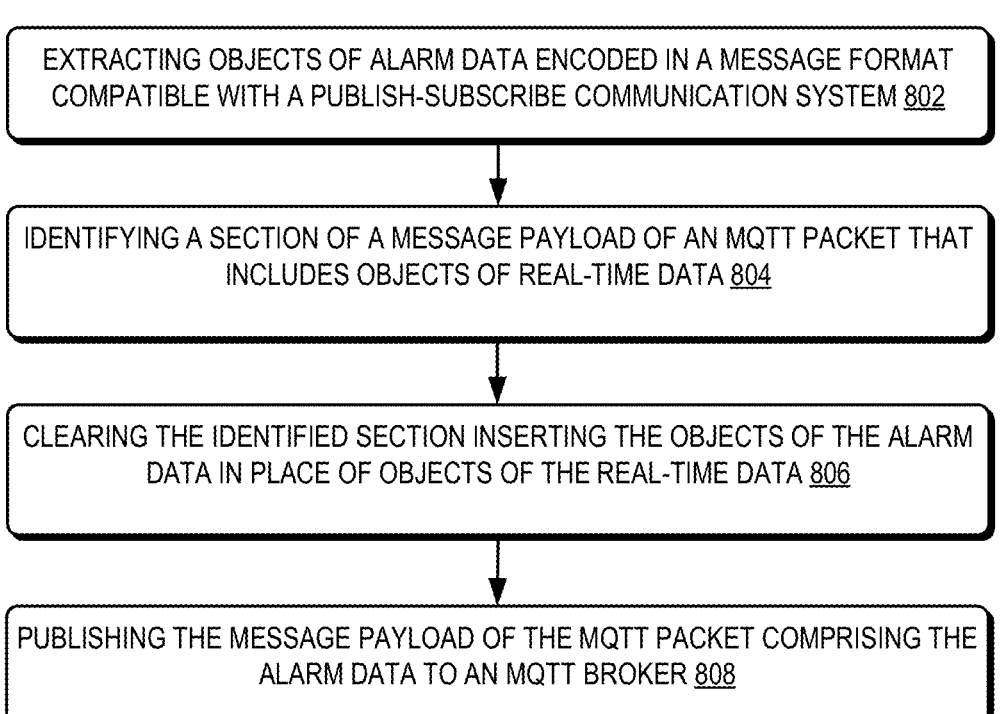

EXTRACTING OBJECTS OF ALARM DATA ENCODED IN A MESSAGE FORMAT COMPATIBLE WITH A PUBLISH-SUBSCRIBE COMMUNICATION SYSTEM 802

IDENTIFYING A SECTION OF A MESSAGE PAYLOAD OF AN MQTT PACKET THAT INCLUDES OBJECTS OF REAL-TIME DATA 804

CLEARING THE IDENTIFIED SECTION INSERTING THE OBJECTS OF THE ALARM DATA IN PLACE OF OBJECTS OF THE REAL-TIME DATA 806

PUBLISHING THE MESSAGE PAYLOAD OF THE MQTT PACKET COMPRISING THE ALARM DATA TO AN MQTT BROKER 808

Figure 8

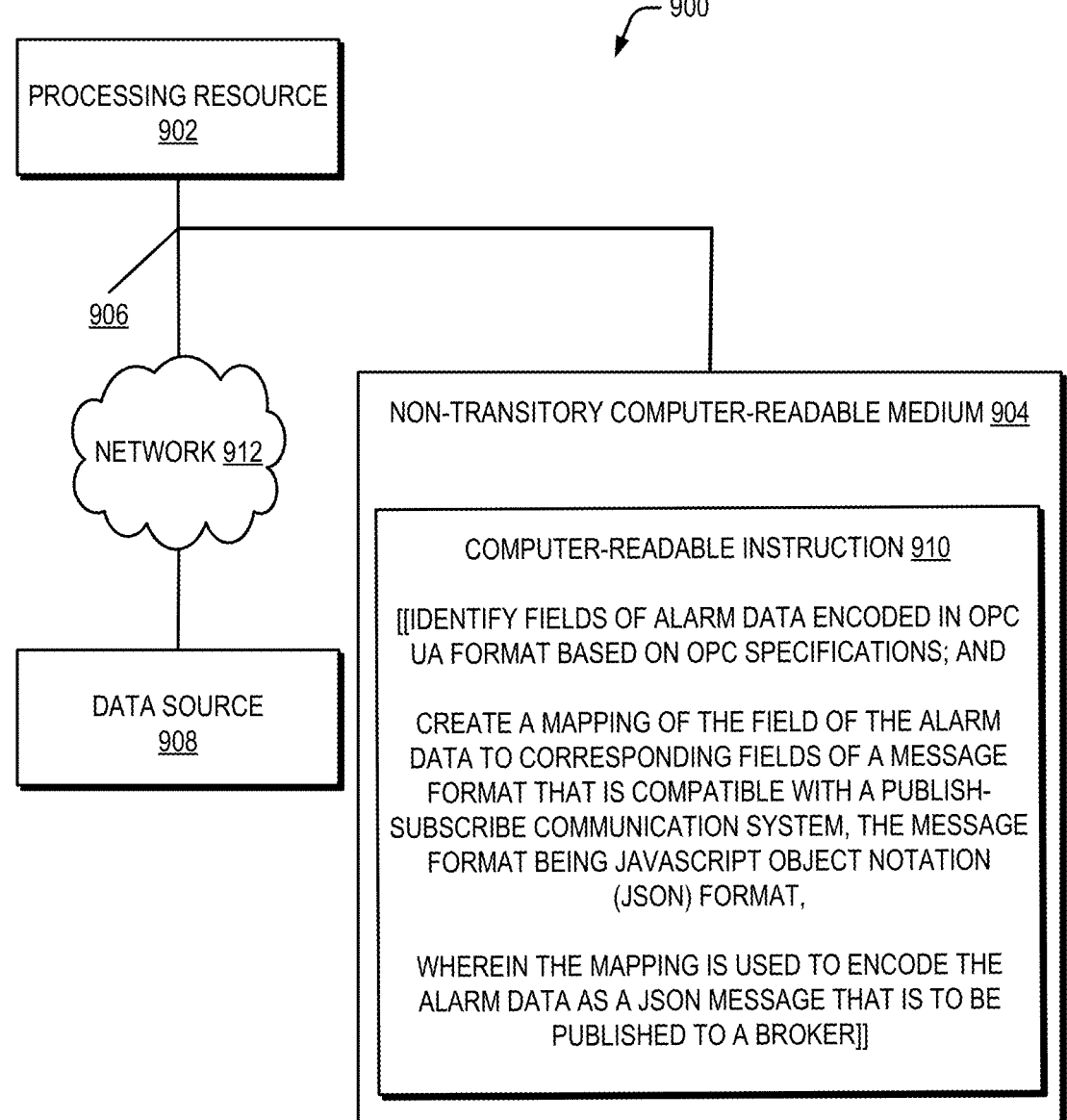

900

PROCESSING RESOURCE
902

906

NETWORK 912

DATA SOURCE
908

NON-TRANSITORY COMPUTER-READABLE MEDIUM 904

COMPUTER-READABLE INSTRUCTION 910

[[IDENTIFY FIELDS OF ALARM DATA ENCODED IN OPC UA FORMAT BASED ON OPC SPECIFICATIONS; AND

CREATE A MAPPING OF THE FIELD OF THE ALARM DATA TO CORRESPONDING FIELDS OF A MESSAGE FORMAT THAT IS COMPATIBLE WITH A PUBLISH-SUBSCRIBE COMMUNICATION SYSTEM, THE MESSAGE FORMAT BEING JAVASCRIPT OBJECT NOTATION (JSON) FORMAT,

WHEREIN THE MAPPING IS USED TO ENCODE THE ALARM DATA AS A JSON MESSAGE THAT IS TO BE PUBLISHED TO A BROKER]]

TRANSMITTING ALARM DATA IN COMMUNICATION SYSTEMS

BACKGROUND

Industrial automation involves using computers and machines to handle different tasks in industries. This automation helps organizations be more efficient, safe, and flexible in their operations. To make sure that the different machines and computers communicate with each other, specialized communication protocols are often utilized.

One of the main communication protocols that these machines use to communicate is Open Platform Communications Unified Architecture (OPC UA) protocol. The OPC UA protocol is a communication protocol tailored for industrial automation. The OPC UA protocol is versatile and focuses on machine-to-machine interactions. It is independent of specific hardware or operating systems. The OPC UA protocol streamlines communication between industrial equipment and systems, facilitating data collection and process control. The OPC UA protocol enables the creation of industrial systems where machines from different manufacturers can communicate with each other.

The OPC UA protocol features a comprehensive information system that is the foundation for data integration. Vendors and organizations can utilize the OPC UA protocol to organize their complex data within an OPC UA "address space," taking advantage of its structured architecture. Industries such as pharmaceuticals, oil, and gas, building automation, robotics, security, manufacturing, etc., and process control have implemented the OPC UA protocol to enhance their operations.

OPC UA employs two communication systems: client-server and publish-subscribe (pub-sub). In the client-server communication system, a client application requests data, including real-time data (DA), historical data (HA), alarms and conditions (AC), and models, from a server, which then responds with the requested information. The client-server communication system is particularly suitable for communications where acknowledgment is desired, ensuring that both parties confirm the information received and sent. The client-server communication system is advantageous for scenarios that require a reliable and secure exchange of information with the capability for each message to be acknowledged and verified. The client-server communication system is thus apt for operations where precise control and confirmation of data receipt are important.

In contrast, the pub-sub communication system involves a server broadcasting data to multiple clients who have subscribed to specific topics of interest, often pertaining to real-time data. The pub-sub communication system is more suitable for communications where acknowledgments are not strictly necessary, allowing for efficient data transmission without the overhead of a bidirectional exchange. The pub-sub communication system provides for simplified communication that is scalable, making it ideal for scenarios with multiple clients receiving data from a single source. Thus, the client-server communication system as well as the pub-sub communication system have different advantages and are implemented in different applications accordingly. The client-server communication system may be implemented for secure, reliable, and acknowledged data transfer, while the pub-sub communication system may be used for simultaneous data distribution to multiple subscribers, offering a scalable and bandwidth-efficient solution for high-volume distributed systems.

SUMMARY

The details of some embodiments of the subject matter described in this specification are set forth in the accompanying drawings and the description below. Other features, aspects, and advantages of the subject matter will become apparent from the description, the drawings, and the claims.

The present subject matter relates to methods, systems, and non-transitory computer-readable media for transmitting alarm data over a publish-subscribe communication system.

According to an aspect of the present subject matter, a method includes collecting alarm data from an Open Platform Communications Unified Architecture (OPC UA) server over a client-server communication system, with the alarm data being encoded in OPC UA format. The method also includes encoding the alarm data into a predefined format that is compatible with a publish-subscribe communication network. This encoding process involves decoding a value from the alarm data based on OPC UA specifications and assigning the decoded value to a preidentified field in the predefined format. The alarm data, now encoded into the predefined format, is assigned to a message payload of a Message Queuing Telemetry Transport (MQTT) packet. The method concludes by publishing the MQTT packet's message payload to an MQTT broker. The MQTT broker can be located on a cloud-based network for remote access or an in-premise network for local storage and access to the alarm data. The alarm data can include, but is not limited to, alarm description, alarm severity, and alarm state. The MQTT packet can be published in response to an alarm event and retrieved for root cause analysis.

In accordance with an embodiment of the present subject matter, the system to transmit alarm data over a publish-subscribe communication system includes a processor to extract values from the alarm data encoded in the OPC UA format and encode these values to predetermined fields in a message having a format compatible with the publish-subscribe communication system. The processor then packages the alarm data into the payload of an MQTT packet, replacing the existing real-time data. The alarm data is then transmitted to an MQTT broker.

In accordance with an embodiment of the present subject matter, the non-transitory computer-readable medium contains instructions that enable a processing resource to identify fields of alarm data encoded in OPC UA format, based on OPC specifications. A mapping of these fields to corresponding fields of a message format compatible with the publish-subscribe communication network is created. The mapping is used to encode the alarm data as a message to be published to a broker. The message format can be JavaScript Object Notation (JSON) format.

Embodiments of the present subject matter offer efficient techniques for the transmission and management of the alarm data. The encoding of alarm data into a predefined format, such as JSON, ensures compatibility with a wide range of systems and applications. Thus, the techniques described herein facilitate easier integration and interoperability between different platforms and devices.

The system's ability to collect alarm data from an OPC UA server and convert it into a format suitable for MQTT transmission enables the transmission of alarm data over a publish-subscribe communication system. By allowing the alarm data to be transferred over the pub-sub communication system, the present system allows for a more complete and holistic view of on-site activities, enabling operators to monitor not just real-time data but also to be alerted to system anomalies and events as they occur. Organizations that already utilize real-time data through the pub-sub communication system can easily adopt this method without the need for additional infrastructure, as it builds upon the existing pub-sub communication system already in place for receiving real-time data. With the ability to receive the alarm data alongside the real-time data, the operators can respond more swiftly to potential issues, minimizing downtime and enhancing the efficiency of plant operations.

Further, the use of a publish-subscribe communication network, specifically MQTT, allows for efficient and reliable distribution of alarm data to multiple subscribers. This provides for real-time monitoring and analysis, enabling prompt responses to alarm events.

In accordance with embodiments of the present subject matter, the flexibility of the MQTT broker's location, being either cloud-based or in-premise, provides options to organizations to choose a solution that fits their specific security, accessibility, and infrastructure requirements.

Additional features and advantages are realized through the concepts of the present invention. Other embodiments and aspects of the invention are described in detail herein and are considered a part of the claimed invention.

BRIEF DESCRIPTION OF FIGURES

Systems and/or methods, in accordance with examples of the present subject matter, are now described and with reference to the accompanying figures, in which:

FIG. 2 illustrates a system to transmit alarm data over a publish-subscribe communication system, in accordance with an example implementation of the present subject matter;

FIG. 5 illustrates a method for transmitting the alarm data over the publish-subscribe communication system, according to an example implementation of the present subject matter;

FIG. 6 illustrates a method for transmitting the alarm data over the publish-subscribe communication system, according to another example implementation of the present subject matter;

FIG. 7 illustrates a method of translating the alarm data from a message format compatible with a client-server communication system to a message format that is compatible with the publish-subscribe communication system, according to an example implementation of the present subject matter;

FIG. 8 illustrates a method of replacing real-time data within a payload of a communication packet with the alarm data for transmission over the publish-subscribe communication system, according to an example implementation of the present subject matter; and FIG. 9 illustrates a computing environment for transmitting alarm data over a communication system, according to an example implementation of the present subject matter.

DETAILED DESCRIPTION

Figure 1:
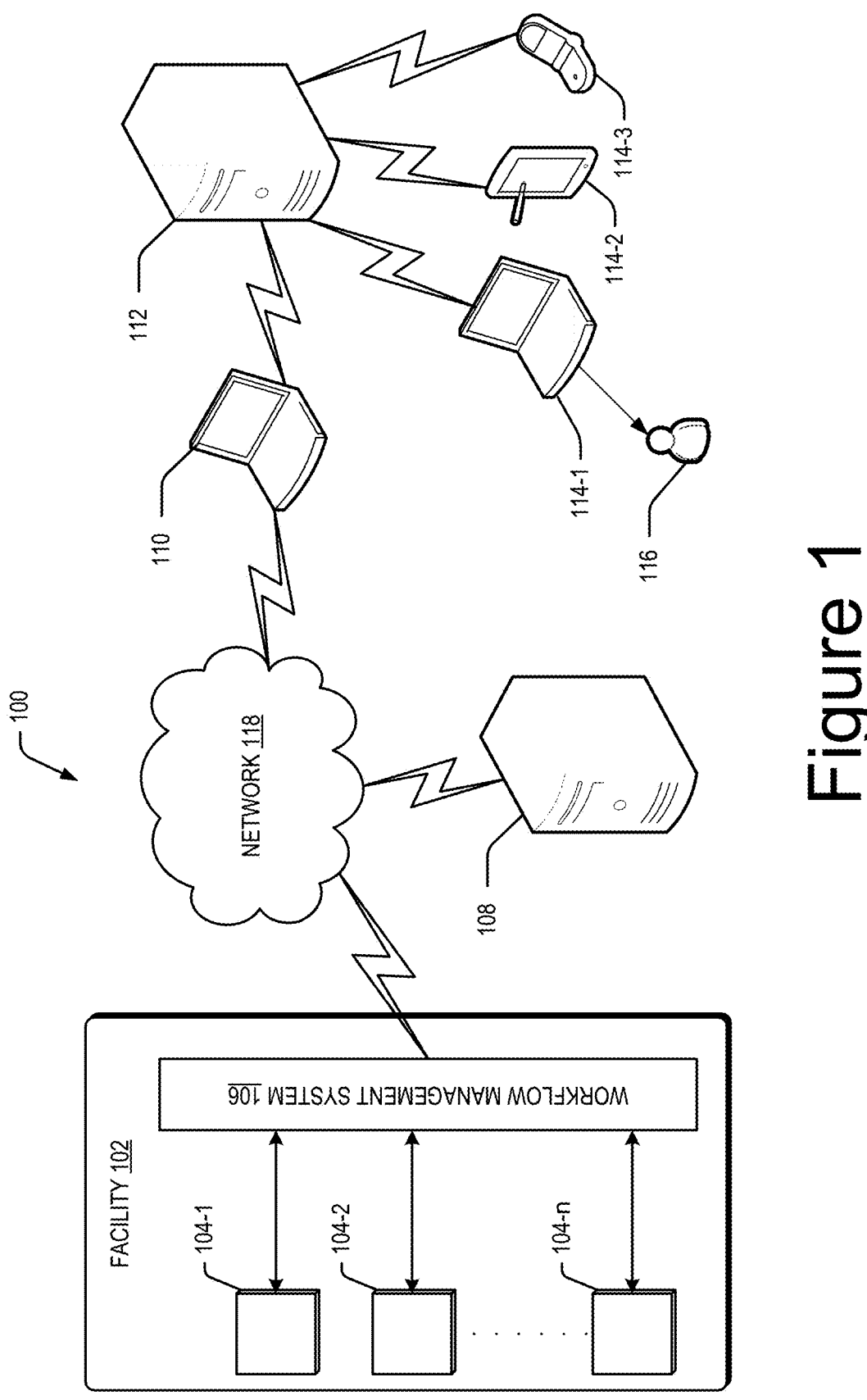
FIG. 1 illustrates a network environment comprising a system to transmit alarm data over a communication system, in accordance with an example implementation of the present subject matter.

As discussed above, a client-server communication system allows for a bidirectional flow of data with acknowledgments. However, this bidirectional flow of data in the client-server communication system can introduce latency in communication. The client-server communication system is similar to a conversation between two people over walkie-talkies. One person (client) presses a button and asks a question or requests information. The other person (server) receives the request, processes the request, and responds back. This back-and-forth exchange ensures that both parties acknowledge the information received and sent. However, if many people start using their walkie-talkies at the same time, trying to talk to the same person, it may lead to delays, or 'latency,' as each one waits for their turn to communicate and receive a response.

Pub-sub communication system, on the other hand, does not require individual connections for each subscriber; instead, subscribers receive messages based on their topic subscriptions, allowing a single message to reach all interested parties. The send-only nature of the pub-sub communication system, without message acknowledgments, enables the pub-sub communication system to transmit data more efficiently. This system simplifies communication and is scalable, suitable for scenarios with multiple clients receiving data from a single source. For example, in an industrial setting, a temperature sensor on a machine may act as a publisher in the pub-sub communication system. If the sensor detects a temperature that is too high, the sensor sends out an alarm message. All monitoring systems (subscribers) that are subscribed to receive temperature alerts from the sensor would receive the alarm message at the same time. There is no direct acknowledgment from each monitoring system. Each monitoring system takes the information and acts accordingly, such as triggering a cooling system or alerting a technician. This efficient distribution of information allows for quick, simultaneous updates to all interested parties without the delays that can occur in a client-server setup.

Additionally, in the client-server communication system, each message sent requires a relatively large data header, typically around 240 bytes. The large header size may not be suitable for high volumes of data transmission, as the large header adds overhead to each message transfer. This may result in increased network congestion, slower data processing, and higher bandwidth costs. In contrast, the pub-sub communication system uses a smaller data header, typically around 40 bytes, reducing the overhead and allowing for more efficient network resource utilization.

Furthermore, scaling in cloud environments may be challenging for the client-server communication system due to its handling of multiple connections. In the client-server communication system, each client requires a dedicated TCP connection to a server for data exchange, which has to be maintained throughout the communication. Cloud-based computing systems often have limitations on the number of concurrent connections they can handle without incurring substantial costs. The client-server communication system's limited capacity for multiple connections can restrict scalability in the cloud-based computing systems. As the number of clients and workload increases, the server may reach its capacity, hindering further expansion without considerable infrastructure enhancements.

The pub-sub communication system, however, does not encounter the issue of managing multiple connections. The pub-sub communication system eliminates the need for dedicated connections for each client by using a one-to-many communication approach, distributing data to all subscribers efficiently. Consequently, the pub-sub communication system enables a cloud server to handle an unlimited number of subscribers without the resource constraints and scalability challenges associated with the client-server system.

Because of the decreasing number of message transmissions in a network, the pub-sub communication system is more efficient than the client-server communication system as it enables scalability and efficiency, particularly in scenarios where data is broadcast from one to many recipients. Thus, the pub-sub communication system may perform well in environments with a large number of clients because the pub-sub communication system does not require a direct connection between each client and server, unlike client-server communication system. This reduces overhead associated with maintaining multiple connections and allows for a more efficient distribution of data.

However, as per OPC UA specification, the pub-sub communication system is currently designed for the transmission of real-time data only. The real-time data refers to information that reflects the immediate state or changes within a system, such as sensor readings or operational status updates. The pub-sub communication system is utilized in broadcasting the real-time data from one source to many recipients, which is suitable for scenarios where timely dissemination of information is of significance.

However, OPC Foundation, which is a governing body responsible for the development and maintenance of the OPC UA specification, has not yet fully extended the functionality of the pub-sub communication system to encompass all data types, particularly those that are not time-sensitive, such as historical data or alarm data.

Within the context of the OPC UA specification, the alarm data encompasses a broad category of system notifications that may include alarms, conditions, and events. Events may be understood as simple notifications. For example, in an industrial automation system, a sensor that detects a watering system turning on may send an event notification. Events are straightforward occurrences to notify that something has happened, but the events do not keep track of ongoing situations around the notified event. The conditions are more complex. The conditions may be understood as ongoing operations that a system, for example, the industrial automation system, may need to keep track of. For instance, if an equipment in the industrial automation system starts overheating, the industrial automation system may create a condition. This condition is indicated in the industrial automation system and is updated with new information, for example, "The equipment is still overheating" or "The equipment has cooled down now." Therefore, in the context of this example, a condition is similar to an ongoing conversation about the equipment's temperature. The alarms may be understood as specific types of conditions that signal an anomaly and usually require immediate attention. For example, if the temperature of the overheating equipment crosses a threshold temperature, the industrial automation system may trigger an alarm, which is a kind of condition that may say, "This is urgent! The equipment is too hot, and it may be dangerous." The alarms have different levels of severity and often require someone to acknowledge and address the issue. Therefore, alarm data is designed to inform operators of an industrial automation system about specific occurrences or deviations from normal operation.

The reason that the existing pub-sub communication systems defined by the OPC UA specification do not support the transfer of the alarm data, inter alia, is that the alarm data often requires a more complex interaction model, including the ability to request specific data ranges, acknowledge receipt of alarms, and perform more sophisticated query and retrieval operations. These requirements are not inherently supported by the pub-sub communication system, which is optimized for pushing out the latest data without maintaining a state or history, as discussed above. The alarm conditions, for example, may involve a stateful interaction where a system, for example, the industrial automation system, may expect acknowledgments, confirmations, and possibly a dialogue with an operator to resolve the condition. Such interactions are more suitably handled by the client-server communication system, where a client can make specific requests and receive tailored responses from a server. Moreover, the alarm data may require a persistent state or historical tracking, which is not a primary concern in the pub-sub communication system, where the focus is on the dissemination of current state information.

In an industrial automation scenario, a plant that has a network of sensors and actuators connected to a central control system may require both real-time monitoring of sensor data for operational efficiency and management of the alarm data for safety and maintenance purposes. However, since the pub-sub communication system in its current form does not support the transmission of the alarm data, the plant cannot rely on it alone for alarm management. As a result, a client-server communication system alongside the pub-sub communication system, each with its own protocols, maintenance requirements, and potential points of failure, may be required to be maintained in the plant. This dual infrastructure results in increased complexity in the architecture of communication protocols, higher development and maintenance costs, and inefficiencies in responding to alarm events due to the separation of the two communication systems.

Thus, due to the limitations of the pub-sub communication system in supporting the transmission of only the real-time data, there may be scenarios where implementing both the client-server and pub-sub becomes necessary. This approach may not always be desirable due to increased complexity and management overhead.

The present subject matter provides approaches for transmitting alarm data over a pub-sub communication system. These approaches include leveraging and extending encoding rules defined by Open Platform Communications Unified Architecture (OPC UA) specification to cover alarm data and then packaging the alarm data for transmission to a broker that is compatible with the pub-sub communication system to ensure that the alarm data is delivered to subscribers. This approach allows industrial automation systems to leverage the benefits of the pub-sub communication system for the alarm data that is generally managed by the client-server communication model, thereby simplifying the industrial automation systems architecture, and reducing management overhead.

Example implementations of the present subject matter provide for receiving the alarm data by the broker of the pub-sub communication system which then filters the alarm data and distributes the filtered alarm data to the subscribers to the broker, such as monitoring applications or control systems, that have previously subscribed to specific alarm data topics. The subscribers may store the received alarm data in a specialized database for later retrieval. This is particularly useful for conducting root cause analysis to determine the origins of an issue, such as equipment failure or process deviation.

The alarm data may also be stored to comply with regulatory requirements. For example, in industries handling toxic chemicals, regulations may mandate the retention of the alarm data for a specified duration to track any accidental releases into the environment. The alarm data can also be displayed in real-time on screens in a control room, allowing operators to monitor and respond to alarms as they occur. Industrial control systems may use software to categorize alarms and highlight them with different colors for prioritization and quick action. In some cases, the reception of an alarm may trigger an automated or manual response, such as opening a relief valve to mitigate an overpressure condition in a tank. Thus, the alarm data received by the broker of the pub-sub communication system is utilized for both immediate operational responses and long-term analysis and compliance. The treatment of the alarm data can be similar to how the alarm data is generally handled in client-server communication systems but with the added benefits of the publish-subscribe model, such as improved scalability and real-time data distribution.

In an example, the method comprises collecting the alarm data from an OPC UA server. The alarm data received from the OPC UA server is compatible with the client-server communication system and is encoded in an OPC UA format, which is a standardized format for industrial automation data exchange. The collected alarm data is then encoded into a predefined format that is suitable for a pub-sub communication system. The encoding of the alarm data into the predefined format includes decoding a value from the alarm data based on OPC UA specifications. This may involve interpreting the alarm data encoded in the OPC UA format to extract meaningful information such as alarm types, severities, and states. The decoded value is then assigned to a preidentified field within the predefined format. This predefined format may be, for example, JSON (JavaScript Object Notation).

Once the alarm data is encoded into the predefined format, the alarm data encoded in the predefined format is assigned to a message payload of an MQTT packet. The method further includes publishing the MQTT packet's message payload, which now contains the alarm data in the predefined format, to an MQTT broker. The MQTT broker is responsible for managing the distribution of messages to clients that are subscribed to the relevant alarm data topics.

Accordingly, the present subject matter enables the distribution of alarm data over the pub-sub communication system, which is traditionally suited for real-time data.

The techniques of the present subject matter allow for the use of existing pub-sub communication system infrastructure, which is already in place for the transmission of the real-time data, to be extended for the transmission of the alarm data. Thus, industries may not be required to invest in separate systems or protocols for handling the alarm data, leading to cost savings and simplified system architecture. Further, by encoding the alarm data into a format that is compatible with the pub-sub communication system, the present subject matter enables the simultaneous distribution of the alarm data to multiple subscribers without the overhead of individual connections that are characteristic of the client-server communication system. Furthermore, by leveraging this pub-sub communication for the alarm data, the present subject matter ensures that subscribers receive timely notifications about alarm conditions, which is paramount for prompt response and mitigation of potential issues in industrial processes.

As the number of subscribers or the volume of alarm data increases, the publish-subscribe model can be scaled more effectively than the client-server communication system without a corresponding increase in complexity or communication latency. Since the message in the pub-sub communication system can be implemented with a smaller data header compared to the client-server communication system, the method can lead to reduced network congestion. Thus, the techniques disclosed herein may be beneficial in industrial environments where network bandwidth may be limited. Integrating the alarm data transmission into the existing pub-sub infrastructure may also simplify system management as the operators can monitor and respond to both the real-time and alarm data through a unified system, streamlining operations and potentially reducing the likelihood of human error.

The above techniques are further described with reference to FIG. 1 to FIG. 9. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a network environment 100 for implementing examples techniques to transmit alarm data over a publish-subscribe communication system, in accordance with an example implementation of the present subject matter.

Industrial processes are carried out in an industrial facility 102 (hereinafter facility), such as oil refineries, chemical plants, paper mills, etc., wherein a plurality of equipments 104-1, 104-2 . . . , 104-n, installed in the facility 102 operate in conjunction with each other to accomplish a predefined task. For example, in the case of an HVAC system, equipments such as chillers, boilers, heat exchangers, and pumps operate in conjunction with each other to air condition a premises. The industrial process may involve chemical, electrical, or mechanical procedures for a predefined purpose, for instance, to manufacture an item, or provide air conditioning, or generate fire alerts.

A workflow management system (WMS hereinafter) 106 may be implemented to control the industrial process of the facility 102. The WMS 106 controls the equipments 104-1, 104-2 . . . , 104-n, such that the industrial process is performed in accordance with a standard operating procedure (SOP) to accomplish the predefined task.

The WMS 106 may be any computing device, such as a server, a desktop computer, or a laptop. The WMS 106 may comprise one or more processors for executing instructions to control and monitor operating parameters of the equipments 104-1, 104-2 . . . , 104-n.

In an example, the operating parameters of an equipment may be understood as attributes of the equipment that may be controlled or measured. Examples of the operating parameters may include operational state, such as an 'off' or 'on' state of an equipment as well as variable parameters, such as temperature and pressure associated with various components of the equipment, that may be sensed, for example, by a corresponding sensor. Referring to the above example of the HVAC system implemented to air condition a premise, the equipments, i.e., the chillers, boiler, heat exchangers, and pumps may be operated in accordance with the predefined range of values of the operating parameters of the HVAC system, which considers various factors, such as the temperature to be maintained in the premises, ambient temperature, humidity, etc.

In an example, the WMS 106 may operate independently or be integrated into a distributed control system (DCS) (not shown in the figures). The WMS 106 may be used to specify various constraints for the DCS which may in turn monitor or control the operating parameters of the equipments 104-1, 104-2 . . . , 104-n.

To control the equipments 104-1, 104-2 . . . , 104-n, the WMS 106 may define a range of values for operating parameters of the equipments 104-1, 104-2 . . . , 104-n. In an example, the WMS 106 may define the range of values for the various operating parameters in accordance with an SOP corresponding to the industrial process that the equipments 104-1, 104-2 . . . , 104-n are operable to carry out in the facility 102. For optimal operation of the industrial processes, the equipments 104-1, 104-2 . . . , 104-n are made to operate in a manner that their operating parameters remain within the predefined range of values.

As will be understood, the optimal operation of an industrial process may be defined with respect to one or more measurable objectives or KPIs that may be predefined. To achieve the one or more predefined KPIs, the industrial process may be executed in different modes. For example, a sustainability mode of the industrial process may be configured to achieve a KPI, such as a substantially small quantity of carbon emissions. Similarly, a performance mode of the industrial processes may be configured to achieve another KPI, such as a high output of the industrial process. The performance mode may achieve a higher output as opposed to the sustainability mode at the expense of carbon emissions that may be higher than in the sustainability mode. Similarly, a hybrid mode where the output of the industrial process may be lower than that in the performance mode but higher than the sustainability mode, and at the same time the carbon emission although higher than the sustainability mode is lower than the performance mode, is also possible.

Accordingly, a KPI of an industrial process may be defined as a measurable objective of the industrial process. For each of the different sets of KPIs defined for an industrial process, a corresponding mode of the industrial process may be defined. To achieve the predefined KPI corresponding to a mode of an industrial process, the equipments involved in carrying out the industrial process may have to be operated in accordance with constraints associated with the predefined KPI. For instance, in the sustainability mode, an equipment, such as a motor may not be operated above a certain level of torque if it results in a value of carbon emissions being greater than what is prescribed for the predefined KPI. The operating parameters of the equipments involved in the industrial process are thus set in accordance with the predefined KPI, and a predefined range of values may be defined for each of the operating parameters of the equipments to meet the KPI(s).

In operation, an equipment from the one or more of equipments 104-1, 104-2, . . . , 104-n installed in the facility 102, may experience a deviation in one or more of its operating parameters with respect to the corresponding range of values that is predefined, for example, to achieve one or more KPIs. In an example, the deviation may be defined as a measure of the deviation of a current value of the operating parameters from the range of the predefined values. In an example embodiment of the present subject matter, the deviation in the one or more operating parameters of the equipments 104-1, 104-2, . . . , 104-n with respect to the corresponding range of values that are predefined for the equipments 104-1, 104-2, . . . , 104-n may lead to a generation of alarm data.

For example, consider a pipeline installed in a facility that is monitored for temperature as one of its operating parameters. An acceptable range of the temperature for safe and efficient operation of the pipeline may be predefined to be between 70° C. and 90° C. If the temperature sensor connected to the pipeline detects a value that falls outside of this range, such as 95° C., this would constitute a deviation. When such a deviation occurs, this may trigger the generation of the alarm data. The alarm data may include information about the nature of the deviation, such as the parameter that has deviated (temperature), the current value (95° C.), the predefined acceptable range (70° C. to 90° C.), the magnitude of the deviation (5° C.), and the time at which the deviation occurred. The alarm data may also include additional details such as the severity of the deviation, which could be categorized based on the potential impact on the pipeline's safety, efficiency, or performance. For instance, minor deviations may trigger a warning, while major deviations may trigger a high-priority alarm.

The alarm data generated in the facility 102 may be saved in an OPC UA server 108. The OPC UA server 108 exposes data generated in the facility 102 in an "address space", and this data can be accessed by authorized OPC UA clients 114-1, 114-2, 114-3 that can see what data is available through the address space to choose what data to receive from the OPC UA server 108. As explained earlier, the current version of OPC UA specification specifies a client-server communication system for the data exchange between the OPC UA clients 114-1, 114-2, 114-3, and the OPC UA server 108.

In the client-server communication system, an OPC UA client 114-1, 114-2, 114-3 generally sends a request for data, such as the alarm data, to the OPC UA server 108, and then, the OPC UA server 108 may respond to the request by providing the requested alarm data to the OPC UA client 114-1, 114-2, 114-3. For example, an OPC UA client 114-1, 114-2, 114-3 creates an individual session, subscription, and monitored items to retrieve the alarm data from the OPC UA server 108 in a one-to-one manner. The alarm data that is provided by the OPC UA server 108 is transmitted to each OPC UA client 114-1, 114-2, 114-3 individually that has a session with the OPC UA server 108 and a subscription for the alarm data. The client-server communication system specifies an encoding format for transmitting data, such as the OPC UA format, and a transport protocol, such as transmission control protocol/Internet protocol (TCP/IP).

To this end, to enable the transmission of the alarm data over the pub-sub communication system, the present subject matter provides a system 110.

To facilitate this transmission, the system 110 establishes a communication channel with the OPC UA server 108 to receive the alarm data stored in the OPC UA server 108. The communication channel is compatible with the client-server communication system and acts as a conduit for the system's 110 operations. In the client-server communication system, the system 110 acts as a client requesting the alarm data, and the OPC UA server 108 functions as a server responding to these requests. The communication channel is the medium through which these requests and responses are transmitted.

In the context of the OPC UA specification and system 110, the communication channel facilitates the retrieval of alarm data from the OPC UA server 108. The system 110, acting as the client, uses this communication channel to send requests for the alarm data to the OPC UA server 108, which may be set up to operate as the server within the facility 102 or maybe a cloud-based resource that may be remotely accessed from by the system 110. The OPC UA server 108 processes these requests and sends the requested alarm data back to the system 110 through the same communication channel. This communication channel supports protocols, data formats, and conventions defined by the client-server communication system, ensuring that the data exchange between the system 110 and the OPC UA server 108 is conducted according to the established standards of the OPC UA specification for the client-server communication system. Depending on the configuration of the system 110, the communication channel may be but is not limited to, Transmission Control Protocol/Internet Protocol (TCP/IP), User Datagram Protocol (UDP), Hypertext Transfer Protocol/Secure (HTTP/HTTPS), Web Sockets, Named Pipes, Message Queuing. Such communication channels are known in the art and therefore, their operation is not discussed in detail herein.

The OPC UA server 108 may, in an example, communicate with the WMS 106 to receive the alarm data that is generated in the facility 102, in cases where such data is recorded at the WMS 106. The alarm data that are generated in the facility 102 may be stored in a database (not illustrated) in one example. In an implementation, the database may reside in the OPC UA server 108 or in a memory of the WMS 106 or alternatively may be stored in a memory of any other device, such as an external database server. In one example, the system 110, the OPC UA server 108, and/or the WMS 106 may be connected over a network 114 for the purpose of obtaining the alarm data.

In an example, the network 118 may be a single network or a combination of multiple networks and may use a variety of different communication protocols. The network may be a wireless or a wired network, or a combination thereof. Examples of such individual networks include but are not limited to a global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN). Depending on the technology, the network 118 includes various network entities, such as gateways, and routers; however, such details have been omitted for the sake of brevity of the present description.

As discussed previously, the alarm data generated within the facility 102 is typically managed and transferred using the client-server communication system. In this setup, the OPC UA server 108 is responsible for storing and maintaining the alarm data in an encoding format that is compatible with the client-server communication system. Consequently, when the system 110 retrieves the alarm data from the OPC UA server 108, the system 110 does so in an OPC UA format, which is designed to be interoperable with the client-server communication system. The OPC UA specification outlines various encoding methods to facilitate this compatibility that may include but are not limited to, binary encoding, XML encoding, and JSON encoding. The pub-sub communication system is primarily designed to handle the transmission of real-time data and does not directly support the transportation of the alarm data. Therefore, while the JSON encoding is available within the OPC UA specification for the pub-sub communication system, the JSON encoding is used only for the real-time data in the pub-sub communication system and the transportation of the alarm data encoded in the JSON format directly over the pub-sub communication model is not currently possible without additional mechanisms or extensions to the existing OPC UA specification.

To address this challenge of transmitting the alarm data, which is usually encoded in the OPC UA format suitable only for the client-server communication systems, the system 110 implements a conversion process for the alarm data encoded in the OPC UA format. This conversion process involves encoding the alarm data collected from the OPC UA server 108 into an encoding format that aligns with the encoding format typically used for the real-time data and is compatible with the pub-sub communication system.

To encode the alarm data into the encoding format that is compatible with the pub-sub communication system, the system 110 extracts a value from the alarm data, which is encoded in the OPC UA format. After extraction, the system 110 encodes these values into predetermined fields of the encoding format that is compatible with the pub-sub communication system. The newly encoded alarm data is then packaged as a message into a payload of an MQTT packet by replacing the real-time data already contained in the MQTT packet. As per the OPC UA specification, each message that is sent over the pub-sub communication system includes a header that contains metadata about the message. This header is part of the data portion of an MQTT message, which is encapsulated within what is referred to as a "blob" area. The header, although smaller in the pub-sub communication system than in the client-server communication system, contains several pieces of information that are common to all OPC UA messages, such as security details, timestamps, sequence numbers, and an encryption hash.

The header designed for the pub-sub communication system is structured to accommodate the real-time data within the body of the message. This means that the header includes the timestamps, security information, and hashing value, but the data payload is specifically formatted to represent real-time object data according to the OPC UA specification.

To facilitate the transmission of the alarm data over the pub-sub communication system, the system 110 takes the objects of the alarm data encoded in the format compatible with the pub-sub communication system, for example, JSON objects, and places the JSON objects within the existing pub-sub header. This process involves replacing the real-time data objects that would normally be found in the message payload with alarm data objects. Each alarm object contains the structure and format consistent with the OPC UA messages, but instead of the real-time data, it carries the alarm data.

Since the OPC UA specification does not define a method for transmitting the alarm data over the pub-sub communication system, the system 100 uses this approach to ensure that the alarm data is packaged and transmitted in a manner that is recognizable and usable by the OPC UA clients 114-1, 114-2, 114-3. By doing so, the system 110 effectively adapts the existing pub-sub header and message format to carry the alarm data, which can then be published to an MQTT broker 112 and distributed to subscribers, such as the OPC UA clients 114-1, 114-2, 114-3, who have expressed interest in receiving alarm data for further action by users 116, such as operators of the facility 102, of the OPC UA clients 114-1, 114-2, 114-3. This approach allows the system 110 to leverage the efficiency of the pub-sub model for the alarm data, even though the OPC UA specification is not explicitly provided for this use case.

FIG. 2 shows the system 110, according to an example implementation of the present subject matter. In an example, system 110 comprises a processor 202. In an example, the processor 202 may be implemented as microprocessors, microcomputers, microcontrollers, digital signal processors, central processing units, state machines, logic circuitries, and/or any devices that manipulate signals based on operational instructions. The processor 202 may execute instructions stored in a memory of the system 110 to accomplish functionalities of the system 110.

As explained previously, the pub-sub communication system currently supports the transmission of only the real-time data (DA) and does not support the transmission of other types of data, such as the alarm data. To allow for the transmission of the alarm data over the pub-sub communication system, the system 110 uses encoding rules of the OPC UA specification for encoding the alarm data into a format that is compatible with the pub-sub communication system and uses the existing infrastructure of the pub-sub communication system for transmitting the alarm data, thereby reducing the complexity and management overhead associated with implementing separate infrastructures for different types of data.

In doing so, in an example embodiment of the present subject matter, the processor 202 of the system 110 interrogates the OPC UA server 108 to receive the alarm data from the UA server 108. As discussed above, the system 110 receives the alarm data from the OPC UA server 108 over the client-server communication system. Upon receiving the alarm data, the processor 202 extracts values from the alarm data that are encoded in the OPC UA format. The processor 202 then encodes the extracted values to predetermined fields of a message having a format compatible with the pub-sub communication system.

Thereafter, processor 202 packages the encoded alarm data into a payload of the MQTT packet by replacing the real-time data within the payload of the MQTT packet with the alarm data and transmits that packaged alarm data to the MQTT broker. The MQTT broker then distributes the alarm data to the subscribers, such as the OPC UA clients 114-1, 114-2, 114-3, who have expressed interest in receiving the alarm data. To elaborate on the functioning of the system 110 to encode the extracted values of the alarm data to predetermined fields of the pub-sub compatible message, reference is made to FIG. 3.

Figure 3:
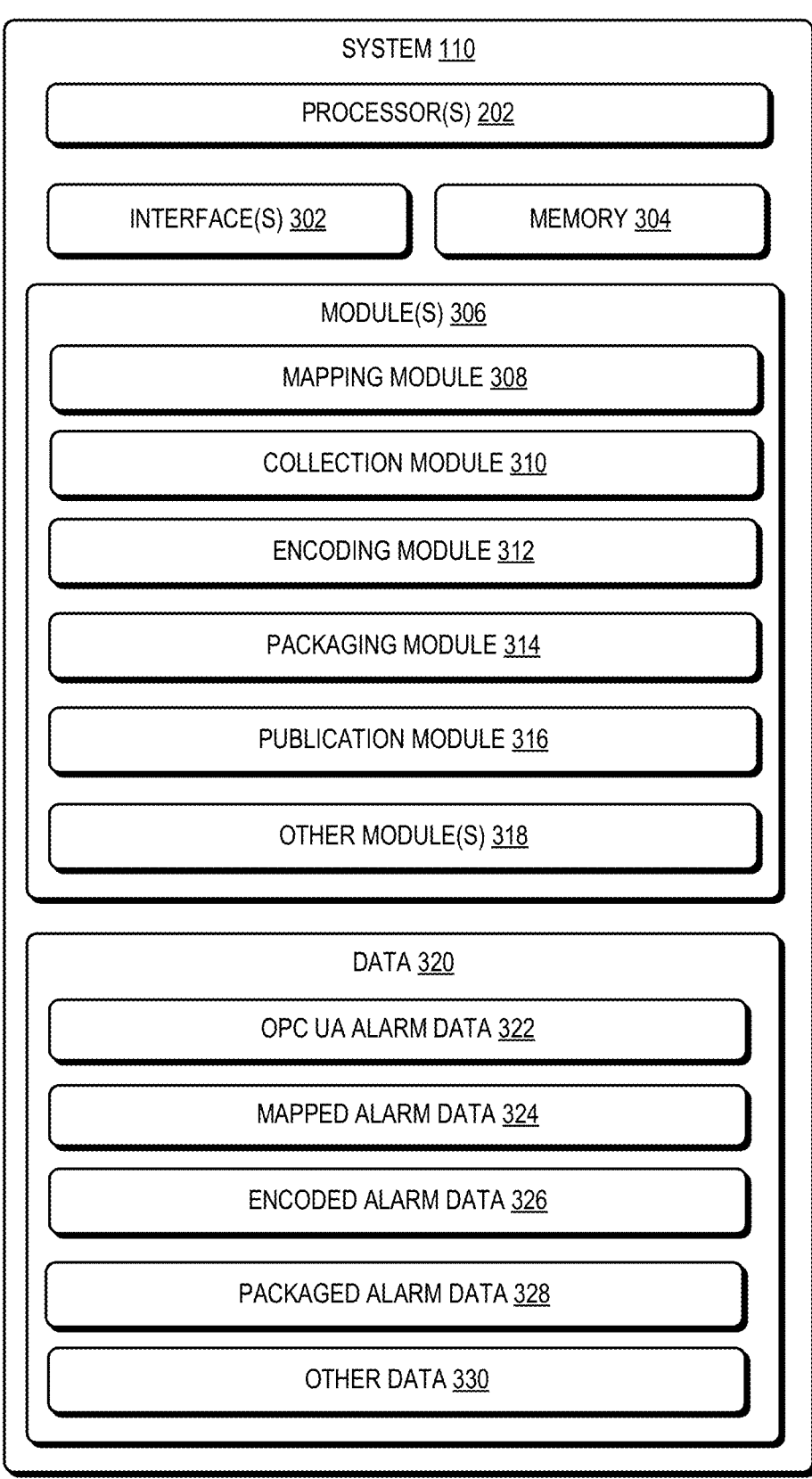
FIG. 3 illustrates the system to transmit the alarm data over the publish-subscribe communication system, in accordance with another example implementation of the present subject matter.

FIG. 3 illustrates the system 110 according to another example implementation of the present subject matter. In an example, the system 110 depicted in FIG. 3 may be any computing device. Examples of the system 110 include but are not restricted to servers, desktop computers, laptops, smartphones, personal digital assistants (PDAs), and tablets.

As explained previously, the alarm data in an industrial setting, such as the facility 102, comprises various types of notifications that may indicate deviations in the operation of equipments, such as the equipments 104-1, 104-2 . . . , 104-n, installed in the facility 102, from the predefined range of values of the operating parameters. These notifications may be categorized into alarms, events, and conditions. The alarms generally signify critical or abnormal situations that require immediate attention, such as equipment failures, safety hazards, or process deviations. For example, an alarm notifying high-pressure in a boiler of the facility 102 indicates that the pressure has exceeded safe levels, requiring urgent action to prevent equipment damage or personnel injury. Compared to alarms, events are less critical notifications that capture noteworthy occurrences in the industrial process, such as equipment start-ups, shutdowns, or changes in operating modes. While the events may not require immediate intervention, the events provide information for monitoring and analyzing the performance of the equipments, for example the equipments 104-1, 104-2 . . . , 104-n, installed in the facility 102, over time. The conditions represent states or statuses of specific parameters within the industrial setting. These may include operating conditions like temperature, pressure, flow rates, or the status of equipment components such as valves or pumps. The conditions help the operators track health and performance of the equipments 104-1, 104-2 . . . , 104-n and detect trends or patterns that may indicate issues before they escalate into alarms. Thus, together, alarms, events, and conditions constitute the alarm data generated by industrial processes, providing the operators with insights into the state of the equipments 104-1, 104-2 . . . , 104-n, and in turn of the facility 102, and enabling timely responses to ensure safety, efficiency, and productivity of the industrial process being carried out in the facility 102.

Once generated, the alarm data is transmitted to the OPC UA server 108. The OPC UA server 108 acts as a centralized repository that collects and organizes various types of data relating to the industrial process being carried out in the facility 102, including the alarm data generated in relation to the industrial process in the facility 102. The OPC UA server 108 exposes this alarm data in the "address space," which authorized OPC UA clients 114-1, 114-2, 114-3 can access. These OPC UA clients 114-1, 114-2, 114-3 can view the available alarm data through the address space and select the specific alarm data they wish to receive from the OPC UA server 108. As explained previously, in an example, an OPC UA client, such as the OPC UA client 114-1, 114-2, 114-3, can create an individual session, subscription, and monitored items to retrieve the alarm data from the OPC UA server 108 in a one-to-one manner. The OPC UA server 108 responds to each client's 114-1, 114-2, 114-3 request by providing the requested alarm data individually to that client 114-1, 114-2, 114-3, using a specified encoding format such as the OPC UA format and a transport protocol like the TCP/IP.

As discussed previously, the pub-sub communication system provides an efficient mechanism for disseminating the alarm data across industrial automation networks by allowing multiple clients to simultaneously receive updates as they occur, without the overhead of establishing and maintaining individual connections. The pub-sub communication system's inherent scalability, coupled with its capacity for real-time data distribution and reduced network traffic, provides for the alarm data to be transmitted within the pub-sub communication system.

In accordance with an example implementation of the present subject matter, the system 110 is configured to facilitate the transmission of the alarm data over the pub-sub communication system within the OPC UA specification so as to enhance the efficiency and scalability of data dissemination and also provide a comprehensive view of on-site activities, which is invaluable for all users who may require the real-time data to make informed decisions and respond promptly to emerging situations.

In an example implementation, the system 110 comprises the processor 202. The system 110 also comprises interface(s) 302 coupled to the processor 202. The interface(s) 302 may include a variety of software and hardware interfaces that allow interaction of the system 110 with other communication and computing devices, such as network entities, web servers, and external repositories, and peripheral devices. For example, the interface(s) may couple the system 110 with the OPC UA server 108. The interface(s) 302 may also enable coupling of internal components, if any, of the system 110 with each other.

Further, the system 110 comprises a memory 304 coupled to the processor 202. The memory 304 may include any computer-readable medium known in the art including, for example, volatile memory (e.g., RAM), and/or non-volatile memory (e.g., EPROM, flash memory, etc.). The memory may also be an external memory unit, such as a flash drive, a compact disk drive, an external hard disk drive, or the like. The system 110 may comprise module(s) 306 and data 320 coupled to the processor 202. In one example, the module(s) 306 and data 320 may reside in the memory 304.

In an example, the data 320 may comprise OPC UA alarm data 322, mapped alarm data 324, encoded alarm data 326, packaged alarm data 328, and other data 330. The module(s) 306 may include routines, programs, objects, components, data structures, and the like, which perform particular tasks or implement particular abstract data types. The module(s) 306 further includes modules that supplement applications on the system 110, for example, modules of an operating system. The data 320 serves, amongst other things, as a repository for storing data that may be fetched, processed, received, or generated by one or more of the module(s) 306. The module(s) 306 may include a mapping module 308, a collection module 310, an encoding module 312, a packaging module 314, a publication module 316, and other module(s) 318. The other module(s) 318 may include programs or coded instructions that supplement applications and functions, for example, programs in the operating system of the system 110.

In an example implementation of the present subject matter, the mapping module 308 may be utilized to pre-map fields of the alarm data, which is in the OPC UA encoding format suited for the client-server communication model, to corresponding fields of a message format that is compatible with the pub-sub communication system. This preparatory mapping is performed in advance of executing the functionalities of the system 110. Dataset generated by the pre-mapping of the fields of the alarm data to the corresponding fields of the message format that is compatible with the pub-sub communication system may be stored in the data 320 of the system 110 as the mapped alarm data 324.

In an example, the format supported by the client-server communication system may include but is not limited to, binary encoding, XML encoding, and JSON encoding. On the other hand, the format compatible with the pub-sub communication system may include JSON encoding.

To enable the transmission of the alarm data over the pub-sub communication system, the system 110 may be required to perform a series of operations that convert the alarm data from the OPC UA encoding format, which is compatible with the client-server communication system, into an encoding format that is compatible with the pub-sub communication system.

For the purpose, in an example implementation of the present subject matter, to initiate the series of operations that convert the alarm data, the collection module 310 may procure the alarm data encoded in the OPC UA format that is compatible with the client-server communication system. In an example, the collection module 310 may interrogate the OPC UA server 108 to collect the alarm data that is to be converted into the pub-sub compatible format. To collect the alarm data from the OPC UA server 108, the collection module 310 establishes the communication channel over the network 118. For example, this communication channel may be specifically designed to be compatible with the client-server communication system, which is the standard communication model used by the OPC UA server 108 to transmit the alarm data. The communication channel acts as a conduit through which the alarm data can be transmitted from the OPC UA server 108 to the system 110. The process typically begins with the collection module 310 sending a request to the OPC UA server 108 for the desired alarm data. The OPC UA server 108, upon receiving this request and verifying the authorization of the system 110, responds by sending the requested alarm data back through the network 118.

The alarm data collected from the OPC UA server 108 is OPC UA-based alarm data, which comprises the alarms, conditions, and/or events relevant to the industrial processes within the facility 102. The alarm data that is received by the system 110 is stored in the memory 304 as the OPC UA alarm data 322. The OPC UA alarm data 322 is stored in the encoding format that is native to the OPC UA server 108, which is the encoding format designed to be compatible for transmission over the client-server communication system.

The encoding format of the OPC UA alarm data 322 may not be suitable for the transmission over the pub-sub communication system, as discussed previously. Accordingly, in example implementations of the present subject matter, the encoding module 312 of the system 110 processes the OPC UA alarm data 322 to convert the OPC UA alarm data 322 into the encoding format that is compatible for transmission over the pub-sub communication system.

In operation, the processing of the OPC UA alarm data 322 into the pub-sub compatible format involves the encoding module 312 extracting values from the OPC UA alarm data 322. In an example, the OPC UA alarm data 322 may include various attributes of the alarm data. For example, if the OPC UA alarm data 322 includes an alarm then the attributes of the alarm may include but not be limited to, alarm type that may be indicative of a specific category or type of the alarm that has been triggered. Another attribute may be alarm severity which may be indicative of a level of urgency or impact associated with the alarm. Yet another attribute of the alarm may be timestamps which may be indicative of an exact time at which the alarm was generated. Yet another attribute of the alarm may be location which may be indicative of the specific equipment or process area in the facility 102 where the alarm originated. Yet another attribute of the alarm may be description which may be indicative of a textual description providing details about the alarm.

As discussed previously, before the encoding of the OPC UA alarm data 322 into the pub-sub compatible format can take place, the mapping module 308 may already define how the fields in the OPC UA alarm data 322 correspond to the fields of the pub-sub compatible format. For example, the mapping module 308 may predefine a mapping of the fields in the OPC UA alarm data 322 to the fields in a target message format, where the target message format is a format suitable for transmission over the publish-subscribe system. Such a mapping may be a guide that informs the encoding module 312 of the structure and semantics of the encoding format that is compatible with the pub-sub communication system.

With the extracted values and the mapping as a reference, the encoding module 312 proceeds to encode extracted values of the OPC UA alarm data 322 into the new message format that is compatible with the pub-sub communication system. The encoding involves converting data types of the extracted values of the OPC UA alarm data 322 from the OPC UA format that is compatible with the client-server communication system to those supported by the encoding format that is compatible with the pub-sub communication system.

Further, in accordance with example implementations of the present subject matter, the extracted values of the OPC UA alarm data 322 are placed into the corresponding fields of the target message format based on the mapping provided by the mapping module 308. In an example, the extracted value of the OPC UA alarm data 322 that is placed into the corresponding fields of the target message format is converted into a string representation of the target message format.

To provide an example of encoding the alarm data from the OPC UA encoding format, such as the binary encoding, to the encoding format that is compatible with the pub-sub communication system, such as the JSON encoding, a scenario may be considered where an alarm is triggered due to a high temperature reading from a sensor installed in a facility, such as the facility 102. Firstly, it is determined how each field of the alarm data maps to the corresponding field of the JSON encoding. This may involve understanding the OPC UA specification for alarms, which generally includes fields such as EventId, EventType, SourceNode, Source-Name, Time, Message, Severity, etc. Using an OPC UA SDK or custom parser, the alarm data encoded in the binary format may be decoded to extract the values for each field of the alarm data available in the binary encoding. This process involves reading a binary stream of the alarm data encoded in the binary format and interpreting each segment according to binary encoding rules defined by the OPC UA specification. After extracting the values, a JSON object may be created, and the extracted values are assigned to the corresponding fields in the JSON format. As will be understood, the OPC UA JSON encoding standard defined by the OPC UA specification defines how to represent OPC UA data types in the JSON format.

Once the alarm data is encoded into the target message format that is compatible with the pub-sub communication system, it is stored in the memory 304 as the encoded alarm data 326. This encoded alarm data 326 is then used for further processing.

Once the OPC UA alarm data 322 has been encoded into the target format that is compatible with the pub-sub communication system, the packaging module 314 takes the encoded alarm data 326 and prepares it for transmission over the pub-sub communication system by incorporating the encoded alarm data 326 into the message payload of a communication protocol packet, such as an MQTT packet, as the packaged alarm data 328. The MQTT packet is structured in a way that is recognized by the publish-subscribe communication system and includes all the relevant information that the subscribers may require.

As explained previously, the encoding format supported by the pub-sub communication system is primarily designed to handle the real-time data and not the alarm data. To enable support for the alarm data by the pub-sub communication system, the packaging module 314 is configured to operate to replace the real-time data found in the message payload of the MQTT packet with the encoded alarm data 326. This substitution is made possible because both the real-time data and the alarm data are represented as objects within the OPC UA specification, and they follow the same structural encoding rules. The process of replacing the real time data with the encoded alarm data 326 involves taking the objects of the alarm data encoded in the message format that is compatible with the pub-sub communication system, which is typically transferred over the client-server communication system, and placing the objects of the alarm data inside the existing header-based message structure used for the publish-subscribe communication system. Where one would normally find the real-time data objects in the message payload, the packaging module 314 now inserts the alarm objects.

Thus, the alarm objects contain the same OPC UA-style format as a full message that would be used for the real-time data, however, as will be apparent from the foregoing description, post encoding by the packaging module 314, instead of the real-time values, the message carries alarm information. This approach allows the system 110 to leverage the existing infrastructure of the pub-sub communication system that is already capable of receiving, parsing, and verifying MQTT messages with the real-time data. By copying the structure of the real-time data with the alarm data, the pub-sub communication system can apply the same decoding processes to interpret the alarm messages as is done for the real-time data.

Once the message payload is ready with the packaged alarm data 328, the publication module 316 publishes the packaged alarm data 328 to a broker, such as the MQTT broker 112. The broker serves as an intermediary that receives the alarm data from the system 110 and distributes the alarm data to all subscribed clients, such as the client 114-1, 114-2, 114-3, based on their subscriptions. The clients 114-1, 114-2, 114-3 may subscribe to specific alarm data topics, and the broker ensures that the clients 114-1, 114-2, 114-3 receive messages corresponding to those topics, enabling efficient and targeted alarm data dissemination.

In an alternative embodiment, it is also possible for the system 110 to transmit the encoded alarm data 326 directly to the clients 114-1, 114-2, 114-3 without the involvement of the broker 112. In such a scenario, the system 110 acts as both the publisher and the distributor of the alarm data. This direct transmission can be useful in scenarios where immediate action is required, where the infrastructure does not support a broker, or in cases where the system 110 architecture allows for direct client-system communication.

Figure 4:
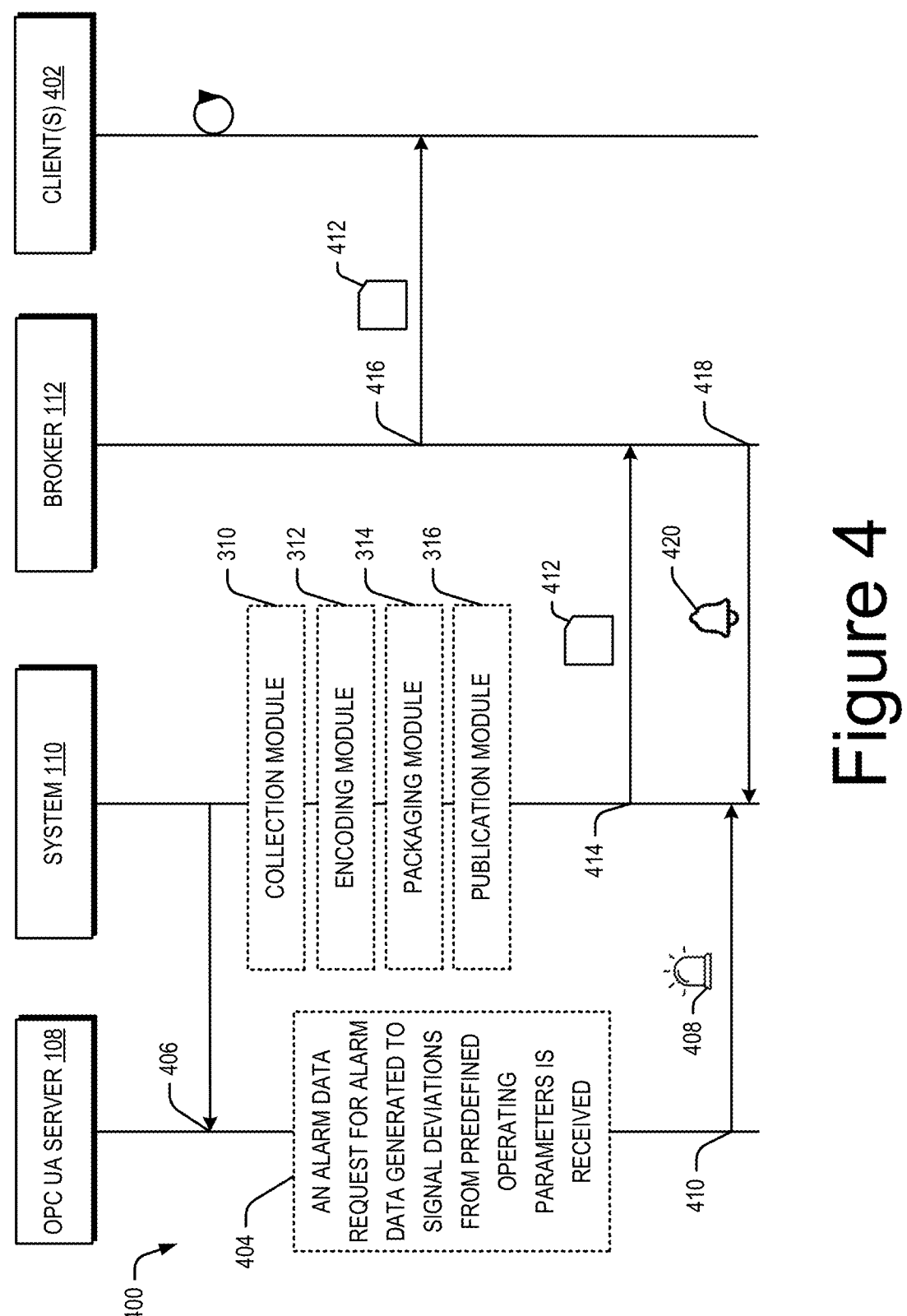
FIG. 4 illustrates a signal flow diagram depicting transmission of the alarm data over the publish-subscribe communication system, in accordance with an example implementation of the present subject matter.

FIG. 4 illustrates a signal flow diagram 400 depicting the transmission of the alarm data over the pub-sub communication system, in accordance with an example implementation of the present subject matter.

The present explanation is provided with reference to the system 110. As discussed previously, to control the equipments 104-1, 104-2 . . . , 104-$n$ of the facility 102, values for the operating parameters of the one or more of the equipments 104-1, 104-2 . . . , 104-$n$ may be predefined. Examples of the operating parameters may include operational state, such as an 'off' or 'on' state of an equipment as well as the variable parameters, such as temperature and pressure associated with various components of the equipments 104-1, 104-2 . . . , 104-$n$, that may be sensed, for example, by a corresponding sensor. As discussed previously, the deviation in the one or more operating parameters of the equipments 104-1, 104-2, . . . , 104-$n$ with respect to the corresponding range of values that are predefined for the equipments 104-1, 104-2, . . . , 104-$n$ may lead to the generation of the alarm data. The alarm data generated in the facility 102 may be saved in the OPC UA server 108.

As discussed previously, to enable the transmission of the alarm data over the pub-sub communication system, the system 110 may be required to perform a series of operations that convert the alarm data from the OPC UA encoding format, which is compatible with the client-server communication system, into the encoding format that is compatible with the publish-subscribe communication system.

In doing so, in an example implementation of the present subject matter, an alarm data request 404 for the alarm data may be received at the OPC UA server 108 from the system 110, for example, the collection module 310 of the system 110. As indicated by step 406, the alarm data request 404, from the system 110, is received at the OPC US server 108. In an example, the request may be made to the OPC US server 108 by the collection module 310 of the system 110.

In an example, the alarm data request 404 may constitute a message initiated by the collection module 310 directed towards the OPC UA server 108. The alarm data request 404 may include several components, such as a request identifier, timestamp, data specification, data format, security credentials, priority level, etc. The request identifier may be used to distinguish the alarm data request 404 from other queries that the OPC UA server 108 may be handling concurrently. The timestamp may indicate the time at which the alarm data request 404 is made, which may be used for logging, tracking, and synchronization purposes. The data specification includes details specifying the type of the alarm data being requested, such as the alarms, conditions, and events. The data format specifies the expected format of the alarm data, which as per the present example, would be the OPC UA encoding format suitable for the client-server communication system. The security credentials comprise authentication information to ensure that the alarm data request 404 is coming from an authorized source. Such authentication of the entity making the alarm data request 404 may be relevant in industrial settings to ensure data security, for instance, in accordance with predefined data security protocols. The priority level may be an optional specification that indicates the urgency of the alarm data request 404, which may influence the OPC UA server's 108 response time.

The purpose of the alarm data request 404 is to initiate the retrieval of the alarm data from the OPC UA server 108. The alarm data retrieved from the OPC UA server 108 is then processed by the system 110 to convert the retrieved alarm data into the format suitable for the transmission over the pub-sub communication system, such as encoding it into the JSON format for MQTT transmission. The OPC UA server 108 may then communicate alarm data 408, such as the OPC UA alarm data 322 discussed in reference to FIG. 3, to the collection module 310 as indicated in step 410.

The collection module 310 may communicate the alarm data request 404 to the OPC UA server 108 and receive the alarm data 408 via one or more communication channels, such as the network 118. Each of such channels may implement communication using different communication systems or protocols, such as the client-server communication system defined by the OPC UA specification. Examples of other such communication protocols may include, open database connectivity (ODBC), transmission control protocol/internet protocol (TCP/IP), serial communication protocol, and file transfer protocol.

As discussed previously, once the collection module 310 receives the alarm data 408 from the OPC UA server 108, the encoding module 312 of the system 110 proceeds to convert the alarm data 408 into the encoding format that is compatible with the pub-sub communication system. This involves the encoding module 312 extracting values from the OPC UA alarm data 322. With the extracted values, the encoding module 312 may then encode extracted values of the alarm data 408 into the target message format that is compatible with the pub-sub communication system. The encoding involves converting the data types of the extracted values of the alarm data 408 from the OPC UA format that is compatible with the client-server communication system to those supported by the encoding format that is compatible with the pub-sub communication system.

The extracted values of the alarm data 408 are placed into the corresponding fields of the target message format based on the mapping provided by the mapping module 308. In an example implementation, the extracted value of the OPC UA alarm data 322 that is placed into the corresponding fields of the target message format is converted into a string representation of the target message format.

Once the alarm data 408 is encoded into the target message format, it may be stored in the memory 304 as encoded alarm data, such as the encoded alarm data 326. This encoded alarm data 326 is then used for further processing. Once the alarm data 408 has been encoded into the target format that is compatible with the pub-sub communication system, the packaging module 314 takes the encoded alarm data 326 and prepares it for transmission over the pub-sub communication system by incorporating the encoded alarm data 326 into the message payload of the communication protocol packet, such as the MQTT packet, as the packaged alarm data 328. The packaging module 314 incorporated the encoded alarm data 326 into the message payload of the MQTT packet 412 by replacing the real-time data in the message payload of the MQTT packet with the encoded alarm data 326.

While the present example implementations have been explained in reference to MQTT protocol, it should be understood that alternative protocols that are compatible with the pub-sub communication system, such as AMQP, CoAP, DDS, XMPP, STOMP, WebSocket, etc., may also be considered for the transmission of the alarm data over the pub-sub communication system, in an example.

As indicated in step 416, the packaged MQTT packet 412, containing the alarm data, is transmitted to a broker 112, such as the MQTT broker 112, by the publication module 316. The MQTT broker 112 receives the alarm data from the system 110 and may distribute the alarm data to subscribed clients, such as a client 402, which may be similar to the OPC UA clients 114-1, 114-2, 114-3, based on their subscriptions.

In accordance with example implementations of the present subject matter, there may be no subsequent action taken by the system 110 to verify receipt of the alarm data by the client 402. As will be understood, the publish-subscribe communication system does not provide for a confirmation of receipt of the alarm data by the client 402. Accordingly, in example implementations, the system 110 may not receive an acknowledgment from the client 402 in response to the receipt of the alarm data by the client 402 to allow for the efficient dissemination of the alarm data without the overhead of managing acknowledgments.

In an example, the client 402 receiving the alarm data via the system 110 may store the alarm data for later retrieval and analysis. This allows for the root cause analysis in an event of malfunctions or failures of the equipments installed in the facility 102. For instance, in a scenario of an industrial accident, such as a refinery incident, the stored alarm data may be reviewed to trace the sequence of events leading up to the incident, identifying the initial alarms that may indicate where and how the incident originated. Additionally, the storage of the alarm data is often a regulatory mandate, for instance, in industries dealing with hazardous materials, where it may be statutorily mandated to maintain records of any alarms related to the storage, usage, processing, and release of toxic substances for compliance and auditing purposes, sometimes for extended periods like seven years.

In some example implementations, the alarm data may be displayed in real-time to the operators in a control room of the facility 102 or a similar monitoring environment. The real-time display may list incoming alarms. Modern display systems may include features, such as color-coding and prioritization to help operators quickly identify and respond to the most urgent issues. This immediate visibility enables the operators to monitor ongoing conditions and, if warranted, take corrective actions, such as adjusting equipment settings or initiating emergency protocols.

As discussed previously, the alarm data may comprise information including alarms, events, and/or conditions. By analyzing this alarm data, the OPC UA clients 114-1, 114-2, and 114-3 can ascertain the root cause for the generation of the alarms, events, and/or conditions, as applicable. This analysis enables the OPC UA clients 114-1, 114-2, and 114-3 to delve into the specifics of what triggered the alarm or event, or what led to a particular condition, thereby facilitating an understanding of the underlying issues within the industrial process or equipment. Identifying these root causes is integral to implementing effective corrective measures and preventing future occurrences.

FIG. 5 illustrates a method 500 for transmitting the alarm data over the pub-sub communication system, in accordance with an example implementation of the present subject matter. Although the method 500 and may be implemented in a variety of computer-based systems, for the ease of explanation, the present description of the example method 500 to transmit the alarm data over the pub-sub communication system is provided in reference to the above-described system 110.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that blocks of the method 500 may be performed by programmed computing devices. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 5, at block 502, the alarm data is collected from an OPC UA server, such as the OPC UA server 108, over the client-server communication system. For example, the alarm data may be collected by the collection module 310 of the OPC UA server 108. As explained previously, the OPC UA server 108 stores data related to the operation of various equipments, such as the equipments 104-1, 104-2 . . . , 104-n, installed within a facility, such as the facility 102. The alarm data is generated when one or more of the equipments 104-1, 104-2 . . . , 104-n deviate from its predefined operating parameters, which may indicate an issue or fault. The OPC UA server 108 structures the alarm data in a specific format defined by the OPC UA specifications. This format is designed to be compatible with the client-server communication system.

To access the alarm data, an OPC UA client, such as the system 110, initiates the alarm data retrieval process. This is done by sending a request over a network, such as the network 118, to the OPC UA server 108. The request specifies the alarm data that the system 110 wishes to access. The communication between the system 110 and the OPC UA server 108 may occur over a standard network protocol, such as the TCP/IP. This protocol facilitates the transmission of the alarm data over the network 118 and is compliant with the client-server communication system.

Upon receiving the request from the system 110, the OPC UA server 108 processes the request and responds by sending the requested alarm data back to the system 110. The alarm data is transmitted in the OPC UA format, which is designed to be compatible with the client-server communication system. As discussed previously, the alarm data that is received by the system 110 may be stored in the memory 304 of the system 110 as the OPC UA alarm data 322 in the format that is compatible with the client-server communication system.

At block 504, the OPC UA alarm data 322, which is originally in the format that is compatible with the client-server communication system, is encoded into the format that is compatible with the pub-sub communication system, for example, by the encoding module 312. This step involves the encoding module 326 extracting a value from the OPC UA alarm data 322 based on OPC UA specifications. The extracted value is then encoded to a preidentified field of the format that is compatible with the pub-sub communication system. The encoding further involves converting data types of the extracted values of the OPC UA alarm data 322 from the format that is compatible with the client-server communication system a predefined format that is compatible with the pub-sub communication system. The predefined format is structured to be understood and utilized by messaging protocols that follow the pub-sub communication system, such as the MQTT.

Once the alarm data is encoded into the predefined format that is compatible with the pub-sub communication system, it is stored in the memory 304 as the encoded alarm data 326 for further processing.

At block 506, the encoded alarm data 326 is assigned to a message payload of the MQTT packet. In an example implementation, the encoded alarm data 326 is prepared, for example by the packaging module 314, for transmission over the pub-sub communication system by incorporating the encoded alarm data 326 into the message payload of the MQTT packet, as the packaged alarm data 328. The MQTT packet is structured in a way that is recognized by the publish-subscribe communication system and includes all the relevant information that the subscribers may require. As discussed previously, to enable support for the alarm data by the pub-sub communication system, the real-time data found in the message payload of the MQTT packet is replaced with the encoded alarm data 326.

At block 508, the message payload of the MQTT packet is published to an MQTT broker, such as the MQTT broker 112. In an example, the publication module 316 initiates the transmission of the packaged alarm data 328 to the MQTT broker 112. Upon receipt, MQTT broker 112 relays the alarm data to all clients that have subscribed to relevant topics, such as the OPC UA clients 114-1, 114-2, and 114-3. These OPC UA clients 114-1, 114-2, and 114-3 may have subscriptions to particular topics of the alarm data, and broker 112 ensures that each OPC UA client 114-1, 114-2, and 114-3 receives the alarm data that pertain to their subscribed topics.

Thus, the example method 500 uses existing e pub-sub communication infrastructure, already in place for handling the real-time data, to also transmit the alarm data. This allows for utilizing a single, unified infrastructure for both types of data, enhancing overall system efficiency and reducing the complexity and cost associated with maintaining separate communication systems for different data types.

FIG. 6 illustrates a method 600 for transmitting the alarm data over the pub-sub communication system, according to another example implementation of the present subject matter.

Although the method 600 may be implemented in a variety of computer-based systems, for ease of explanation, the present description of the example method 600 to transmit the alarm data over the pub-sub communication system is provided in reference to the above-described system 110.

The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that blocks of the method 600 may be performed by programmed computing devices. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 6, at block 602, similar to the step performed at block 502 of the method 500, the alarm data is collected from the OPC UA server 108. The alarm data collected from the OPC UA server 108 is compatible with the client-server communication system.

Further, at block 604, similar to the step performed at block 504 of the method 500, the collected alarm data is encoded into the predefined format that is suitable for transmission over the pub-sub communication system. Once the alarm data is encoded into the message format that is compatible with the pub-sub communication system, it is stored in the memory 304 as the encoded alarm data 326.

At block 606, as explained previously in respect of FIGS. 1-5, the real-time data found in the message payload of the MQTT packet is replaced with the encoded alarm data 326. As will be understood based on the foregoing description, replacing the real time data entails the substitution of the real time data in the MQTT message payload with the encoded alarm data so as to enable the transmission of the encoded alarm data 326 over the pub-sub communication system. The encoded alarm data 326 packaged in the message payload of the MQTT packet by replacing the real-time data is referred to as the packaged alarm data 328.

Thereafter, at block 608, similar to the step performed at block 508 of the method 500, the packaged alarm data 328 is published to the MQTT broker 112. Upon receipt, MQTT broker 112 relays the packaged alarm data 328 to all clients, such as the OPC UA clients 114-1, 114-2, and 114-3, that have subscribed to the relevant alarm data topics. The OPC UA clients 114-1, 114-2, and 114-3 may store the received alarm data in a specialized database, for example, on a cloud storage, for later retrieval.

At block 610, OPC UA clients, such as the OPC UA clients 114-1, 114-2, and 114-3 may retrieve the packaged alarm data 328 transmitted by the MQTT broker 112 for conducting the root cause analysis. The root cause analysis may be understood as a process used to identify the underlying reasons for the occurrence of an alarm event. By understanding the root cause, corrective actions may be taken to prevent future occurrences of similar issues.

In an example, the packaged alarm data 328 may be decoded for root cause analysis by the OPC UA clients 114-1, 114-2, and 114-3. That is, after the OPC UA clients 114-1, 114-2, and 114-3 receive the packaged alarm data 328, the OPC UA client 114-1, 114-2, and 114-3 may decode the packaged alarm data 328 from the format used for transmission over the pub-sub communication system to a format that is suitable for analysis tools or applications used by the OPC UA clients 114-1, 114-2, and 114-3.

In an alternative embodiment, the MQTT broker 112 may send the packaged alarm data 328 in a format that can be directly utilized by the OPC UA clients 114-1, 114-2, and 114-3 for performing the root cause analysis without having to go through the decoding process of the packaged alarm data 328. For example, if the OPC UA clients 114-1, 114-2, and 114-3 are configured to perform the root cause analysis using JSON formatted data, the MQTT broker 112 can publish the alarm data in the JSON format. This allows the OPC UA clients 114-1, 114-2, and 114-3 to directly feed the alarm data into their analysis tools, thereby expediting the diagnostic process, and enabling quicker response to the identified issues.

For instance, in an industrial facility, such as the facility 102, if an automated assembly line experiences an unexpected stoppage, it may lead to triggering of an alarm. This may generate alarm data, which may include the time of the incident, the specific equipment that ceased operation, and the operational parameters at the time, which is collected and transmitted to the OPC UA clients 114-1, 114-2, and 114-3 via the MQTT broker 112. Upon retrieval of this alarm data, the OPC UA clients 114-1, 114-2, and 114-3 may initiate the root cause analysis to determine why the assembly line stopped. The analysis may involve examining the alarm data in conjunction with historical performance data and maintenance records. The root cause analysis, for example, may indicate that the temperature of a motor exceeded its safe operating threshold, leading to the stoppage of the assembly line to prevent damage.

Thus, the pub-sub communication system has several advantages for transmitting the alarm data, including efficient distribution to multiple clients, reduced latency due to the absence of a request-response cycle, and enhanced scalability to handle a growing number of subscribers without increasing server load. Additionally, the pub-sub communication system utilizes bandwidth more effectively with smaller data headers and simplifies client architecture by eliminating the constant polling of the server. Given these advantages, it may be prudent to leverage the pub-sub communication system for the dissemination of alarm data in settings, such as the facility 102, where the pub-sub communication system is already employed for the distribution of the real-time data.

FIG. 7 illustrates a method 700 of translating the alarm data from the message format that is compatible with the client-server communication system to the message format that is compatible with the publish-subscribe communication system, according to an example implementation of the present subject matter.

Although the method 700 may be implemented in a variety of computer-based systems, for ease of explanation, the present description of the example method 700 to translate the alarm data from the message format that is compatible with the client-server communication system to the message format that is compatible with the publish-subscribe communication system is provided in reference to the above-described system 110.

The order in which the method 700 is described is not intended to be construed as a limitation, and any number of the described method blocks may be combined in any order to implement the method 700, or an alternative method. Furthermore, the method 700 may be implemented by processor(s) or computing device(s) through any suitable hardware, non-transitory machine-readable instructions, or a combination thereof.

It may be understood that blocks of the method 700 may be performed by programmed computing devices. The blocks of the method 700 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 7, at block 702, fields of the alarm data that is stored in the OPC UA server 108 and is initially in the OPC UA encoding format suited for the client-server communication system are mapped, for example, by the mapping module 308, to corresponding fields of the target message format that is compatible with the pub-sub communication system. This preparatory mapping may be performed in advance of executing the functionalities of the system 110. The mapping process involves identifying each field of the OPC UA alarm data, such as alarm severity, alarm state, and alarm description, and determining the corresponding field in the target message format, which could be JSON, XML, or another suitable format for pub-sub communication.

In an example, the mapping may be based on the OPC UA specifications, which define the structure and semantics of the alarm data within OPC UA framework. The OPC UA specifications provide a detailed description of the alarm data model, including the types of alarms, their properties, and their relationships. By adhering to these specifications, the mapping module 308 ensures that the semantic integrity of the alarm data is maintained during the translation process. For instance, the OPC UA specifications may define an alarm condition with properties such as 'ConditionId', 'ConditionName', 'ConditionClassId', 'ConditionClassName', 'ConditionSource', 'Severity', 'Quality', 'LastSeverity', 'Comment', 'Enable', and 'Active'. During the mapping process, the mapping module 308 may create a corresponding structure in the target message format, ensuring that each of these properties is represented and that the relationships between them are preserved.

The result of this mapping process is a dataset that represents the alarm data in the target message structure that aligns with the requirements of the publish-subscribe communication system. This dataset, referred to as the mapped alarm data 324, is stored in the data 320 of the system 110. By performing this mapping in advance, the system 110 may quickly translate the alarm data as it is collected, without the delay of dynamic field mapping during the alarm data transmission process.

At block 704, similar to the step performed at block 502 of the method 500 and the step performed at block 602 of the method 600, the alarm data is collected from the OPC UA server 108. This involves establishing a connection with the OPC UA server 108 using the client-server communication system and requesting the alarm data. Once the data is received, it is held in its original OPC UA format that is compatible with the client-server communication system, ready to be transformed into the target message format that is suitable for the transmission over the pub-sub communication system.

At block 706, similar to the step performed at block 504 of the method 500 and the step performed at block 604 of the method 600, once the alarm data is collected from the OPC UA server 108, the encoding module 312 encodes the alarm data into the target message format that has been mapped in step 702. This step transforms the alarm data from the OPC UA format into the format that is suitable for publish-subscribe communication, such as JSON format. The encoding process adapts the alarm data to the structural and data type requirements of the target message format while preserving the original content and meaning of the alarm data.

At block 708, the alarm data is packaged into the message payload of the MQTT packet by replacing the real-time data within the payload with the alarm data. In examples, the operation carried out at block 708 is similar to the step performed at block 506 of the method 500 and the step performed at block 606 of the method 600. In this step, any existing real-time data within the message payload is replaced with the encoded alarm data. This step prepares the MQTT packet for transmission, ensuring that the alarm data is in the target message format and is the primary content of the packet's payload.

At block 710, the message payload of the MQTT packet is published to an MQTT broker, such as the MQTT broker 112. In examples, the operation carried out at block 710 is similar to the step performed at block 508 of the method 500 and the step performed at block 608 of the method 600. The publication module 316 publishes the MQTT packet, which now contains the alarm data payload, to the MQTT broker 112. The MQTT broker 112 then handles the distribution of the alarm data to all subscribed clients, such as the OPC UA clients 114-1, 114-2, 114-3 within the publish-subscribe communication system. This step completes the process of transmitting the alarm data from the OPC UA server to the OPC UA clients 114-1, 114-2, 114-3 over the publish-subscribe communication system, making the data available for real-time monitoring, analysis, or other actions by the OPC UA clients 114-1, 114-2, 114-3.

FIG. 8 illustrates a method 800 of replacing the real-time data within the payload of the MQTT packet with the alarm data for transmission over the publish-subscribe communication system, according to an example implementation of the present subject matter.

Although the method 800 may be implemented in a variety of computer-based systems, for ease of explanation, the present description of the example method 800 to replace the real-time data within the payload of the MQTT packet with the alarm data is provided in reference to the above-described system 110.

The order in which the method 800 is described is not intended to be construed as a limitation, and any number of the described method blocks may be combined in any order to implement the method 800, or an alternative method. Furthermore, the method 800 may be implemented by processor(s) or computing device(s) through any suitable hardware, non-transitory machine-readable instructions, or a combination thereof.

It may be understood that blocks of the method 800 may be performed by programmed computing devices. The blocks of the method 800 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 8, at block 802, objects of the alarm data encoded in the target message format that is compatible with the pub-sub communication system are extracted, for example, by the packaging module 314. The process of extracting the objects of the alarm data has been explained previously in reference to FIGS. 2 and 3.

At block 804, a section of the message payload of the MQTT packet that includes objects of the real-time data is identified, for example, by the packaging module 314. In doing so, the packaging module 314 analyzes the structure of the MQTT packet to identify the payload section. The identification of the payload section is based on the MQTT packet's predefined format, which may include headers or other markers indicating the start and end of the real-time data section within the payload.

At block 806, the identified section of the payload section is cleared, for example, by the packaging module 314, to insert the objects of the alarm data in place of the objects of the real-time data. The clearing of the payload section may involve removing or overwriting the real-time data objects. The alarm data objects are then inserted into the cleared section of the payload. The alarm data objects are structured to maintain the same OPC UA-style format as would be used for the real-time data, ensuring compatibility with the existing pub-sub communication system.

At block 808, the message payload of the MQTT packet, now containing the alarm data, is published, for example, by the publication module 316, to the MQTT broker 112 for distribution to subscribers, such as the OPC UA clients 114-1, 114-2, 114-3 within the publish-subscribe communication system. In examples, the operation carried out at block 808 is similar to the step performed at block 508 of the method 500, the step performed at block 608 of the method 600, and the step performed at block 710 of the method 700.

FIG. 9 illustrates a computing environment 900 for transmitting the alarm data over the pub-sub communication system, according to an example implementation of the present subject matter. The computing environment 900 includes a processing resource 902 communicatively coupled to a non-transitory computer-readable medium 904 through a communication link 906. In an example, the processing resource 902 may be the processor of the system 110, which fetches and executes computer-readable instructions from the non-transitory computer-readable medium 904.

The non-transitory computer-readable medium 904 may be, for example, an internal memory device or an external memory device. In an example implementation, the communication link 906 may be a direct communication link, such as any memory read/write interface. In another example implementation, the communication link 906 may be an indirect communication link, such as a network interface. In such a case, the processing resource 902 may access the non-transitory computer-readable medium 904 through a network 912. The network 912 may be a single network or a combination of multiple networks and may use a variety of different communication protocols.

The processing resource 902 and the non-transitory computer-readable medium 904 may also be communicatively coupled to data sources 908. The data source(s) 908 may be used to store data corresponding to the transmission of the alarm data over the pub-sub communication system, for example.

In an example implementation, the non-transitory computer-readable medium 904 comprises executable instructions 910 for enabling the transmission of the alarm data over the pub-sub communication system.

In an example, the instructions 910 causes the processing resource 902 to identify fields of the alarm data that are encoded in the OPC UA format and create a mapping of the field of the alarm data to corresponding fields of the target message format that is compatible with the publish-subscribe communication system. In an example, the target message format may be JavaScript Object Notation (JSON) format. As explained previously, the fields of the alarm data that is stored in the OPC UA server 108 and is initially in the OPC UA encoding format suited for the client-server communication system are mapped, for example, by the mapping module 308, to the corresponding fields of the target message format that is compatible with the pub-sub communication system. This preparatory mapping may be performed in advance of executing the functionalities of the system 110. The mapping process involves identifying each field of the OPC UA alarm data, such as alarm severity, alarm state, and alarm description, and determining the corresponding field in the target message format. The mapping of the alarm data is used to encode the alarm data as a JSON message that is to be published to a broker, such as the MQTT broker 112.

Thus, the methods and systems of the present subject matter extend the existing pub-sub communication system infrastructure, already in place for transmitting the real-time data, to include the alarm data, thereby eliminating the need for a separate infrastructure dedicated to the alarm data transmission. This integration not only streamlines data management by providing a more comprehensive operational picture through a single channel but also offers cost savings and reduces complexity by leveraging the existing pub-sub network. The ability to use the same infrastructure for both the real-time and the alarm data enhances the system's efficiency and scalability, making it a valuable advancement in industrial automation communication protocols. Users stand to gain a more complete understanding of their industrial processes through the combined transmission of the real-time and alarm data. This comprehensive insight may lead to better decision-making, improved safety, and optimized operational efficiency.

Although implementations to enable transmission of the alarm data over the client-server communication system have been discussed in a language specific to structural features and/or methods, it is to be understood that the appended claims are not necessarily limited to the specific features or methods discussed. Rather, the specific features and methods are disclosed as example implementations for enabling the transmission of the alarm data over the client-server communication system in an industrial facility.

The invention claimed is:

1. A method comprising:
   collecting alarm data from an Open Platform Communications Unified Architecture (OPC UA) server over a client-server communication system, the alarm data being encoded in OPC UA format;
   encoding the alarm data into a predefined format that is compatible with a publish-subscribe communication system, wherein encoding the alarm data into the predefined format comprises:

decoding a value from the alarm data based on OPC UA specifications, and assigning the decoded value to a preidentified field in the predefined format;

assigning the alarm data encoded into the predefined format to a message payload of a Message Queuing Telemetry Transport (MQTT) packet, wherein the message payload of the MQTT packet comprises real-time data, and wherein assigning the alarm data encoded into the predefined format to the message payload of the MQTT packet comprises replacing the real-time data within the message payload of the MOTT packet with the alarm data encoded in the predefined format;

publishing the message payload of the MQTT packet to an MQTT broker.

2. The method of claim 1, wherein the MQTT broker is located on a cloud-based network for remote access to the alarm data.

3. The method of claim 1, wherein the MQTT broker is located on an in-premise network for local storage and access to the alarm data.

4. The method of claim 1, wherein the encoding of the alarm data into the predefined format comprises conversion of data types of the alarm data encoded in the OPC UA format to corresponding data types of the predefined format.

5. The method of claim 1, wherein the MQTT broker is to distribute the alarm data to multiple subscribers for real-time monitoring and analysis.

6. The method of claim 1, wherein the alarm data includes at least one of alarm description, alarm severity, and alarm state.

7. The method of claim 1, wherein the MQTT packet is published to the MQTT broker in response to an alarm event.

8. The method of claim 1, wherein the method further comprises retrieving the message payload of the MQTT packet published to the MQTT broker for root cause analysis.

* * * * *